US008310713B2

(12) United States Patent
Sugimoto et al.

(10) Patent No.: US 8,310,713 B2
(45) Date of Patent: Nov. 13, 2012

(54) IMAGE FORMING DEVICE, IMAGE FORMING PROGRAM, COMPUTER READABLE RECORDING MEDIUM ON WHICH THE PROGRAM IS RECORDED, AND IMAGE FORMING METHOD

(75) Inventors: Tadayuki Sugimoto, Tokyo (JP); Masahiro Ozawa, Machida (JP); Takenori Idehara, Yokohama (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1266 days.

(21) Appl. No.: 10/730,935

(22) Filed: Dec. 10, 2003

(65) Prior Publication Data
US 2004/0143794 A1 Jul. 22, 2004

(30) Foreign Application Priority Data

Dec. 24, 2002 (JP) ................................. 2002-372354
Apr. 22, 2003 (JP) ................................. 2003-117132

(51) Int. Cl.
*G06F 15/00* (2006.01)
(52) U.S. Cl. ...... 358/1.18; 358/1.9; 358/1.15; 358/1.16; 358/1.17; 715/247; 715/251; 715/255
(58) Field of Classification Search ................ 358/1.18, 358/1.9, 1.15, 1.16, 1.17
See application file for complete search history.

(56) References Cited

U.S. PATENT DOCUMENTS

| 6,067,553 | A | 5/2000 | Downs et al. | |
|---|---|---|---|---|
| 6,407,821 | B1* | 6/2002 | Hohensee et al. | 358/1.15 |
| 2002/0067502 | A1* | 6/2002 | Hansen | 358/1.15 |
| 2002/0140958 | A1* | 10/2002 | Lester | 358/1.13 |
| 2002/0171856 | A1* | 11/2002 | Ackerman et al. | 358/1.13 |
| 2003/0237054 | A1* | 12/2003 | Donahue | 715/525 |
| 2004/0216048 | A1* | 10/2004 | Brown et al. | 715/530 |

FOREIGN PATENT DOCUMENTS

| JP | 09-174955 | 7/1997 |
|---|---|---|
| JP | 09-300732 | 11/1997 |

(Continued)

OTHER PUBLICATIONS

Computer translation of Japanese Patent Document No. 09-174955 to Abe Takahide, Jul. 8, 1997.*
Notification of Reasons for Refusal issued in corresponding Japanese Patent Application No. 2003-117132, and translation thereof.

(Continued)

*Primary Examiner* — Mark K Zimmerman
*Assistant Examiner* — Mark Milia
(74) *Attorney, Agent, or Firm* — Buchanan Ingersoll & Rooney PC

(57) ABSTRACT

The printer successively stores the objects contained in the PDF file as they are transmitted from the PC, and conducts the printing process for said specific page when it judges that all the objects necessary for displaying said page are stored. Also, when a memory overflow occurs, it successively prints out content objects contained in the constituent data of the PDF file stored in the RAM, while assigning identification names, and deletes the data for the content objects already printed out from the RAM so that additional constituent data of the PDF file can be received successively. It finally generates and prints out the table of contents based on the identification names of the content object and the information of the page object and the page list object. Thus, it is possible to form images directly receiving a document file such as a PDF file on a printer with a limited usable memory capacity.

32 Claims, 24 Drawing Sheets

FOREIGN PATENT DOCUMENTS

| | | |
|---|---|---|
| JP | 10-269122 | 10/1998 |
| JP | 11-119933 | 4/1999 |
| JP | 11-203282 | 7/1999 |
| JP | 2002-116898 | 4/2002 |
| JP | 2002-264440 | 9/2002 |

OTHER PUBLICATIONS

PDF Reference, Third Edition, Adobe Portable Document Format Version 1.4, Adobe Systems Inc., Dec. 2001, pp. 86-92.
Notification of Reasons for Refusal issued in a corresponding Japanese application and translation thereof.

* cited by examiner

FIG. 11

| OBJECT No. | OFFSET | DELETION FLAG |
|---|---|---|
| 11 0 | 20 | 0 |
| 4 0 | 125 | 0 |
| 5 0 | 276 | 0 |
| ⋮ | ⋮ | ⋮ |

FIG. 12

| PAGE No. | PAGE OBJECT No. | OBJECT No. | DELETION FLAG |
|---|---|---|---|
| 1 | 3 0 | 2 0, 6 0, 8 0, 10 0 | 1 |
| 5 | 4 0 | 2 0, 6 0, 8 0, 13 0, 15 0 | 1 |
| 3 | 5 0 | 2 0, 6 0, 18 0 | 0 |
| ⋮ | ⋮ | ⋮ | ⋮ |

FIG. 13

| OFFSET (byte) | SIZE (byte) |
|---|---|
| 1286 | 269 |

42

PAGE 1        PAGE 2

611

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | UNKNOWN | UNKNOWN | — |

612

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | UNKNOWN | UNKNOWN | — |
| | 3 | CONTENT 2 | UNKNOWN | 4 | — |
| PAGE OBJECT | 4 | — | UNKNOWN | — | 3. 5. 7 |

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | UNKNOWN | UNKNOWN | — |
| | 3 | CONTENT 2 | 1 | 4 | — |
| | 5 | CONTENT 3 | 1 | 4 | — |
| | 7 | CONTENT 4 | 1 | 4 | — |
| | 8 | CONTENT 5 | UNKNOWN | UNKNOWN | — |
| PAGE OBJECT | 4 | — | 1 | — | 3. 5. 7 |
| PAGE LIST OBJECT | 9 | — | — | 4. 11 | — |

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | 2 | 11 | — |
| | 3 | CONTENT 2 | 1 | 4 | — |
| | 5 | CONTENT 3 | 1 | 4 | — |
| | 7 | CONTENT 4 | 1 | 4 | — |
| | 8 | CONTENT 5 | 2 | 11 | — |
| | 13 | CONTENT 6 | 2 | 11 | — |
| PAGE OBJECT | 4 | — | 1 | — | 3. 5. 7 |
| PAGE LIST OBJECT | 11 | — | 2 | — | 1. 8. 13 |
| PAGE LIST OBJECT | 9 | — | — | 4. 11 | — |

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | UNKNOWN | UNKNOWN | — |
| | 3 | CONTENT 2 | UNKNOWN | 4 | — |
| | 5 | CONTENT 3 | UNKNOWN | 4 | — |
| | 7 | CONTENT 4 | UNKNOWN | 4 | — |
| PAGE OBJECT | 4 | PAGE A | UNKNOWN | — | 3. 5. 7 |

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | UNKNOWN | UNKNOWN | — |
| | 3 | CONTENT 2 | 1 | 4 | — |
| | 5 | CONTENT 3 | 1 | 4 | — |
| | 7 | CONTENT 4 | 1 | 4 | — |
| | 8 | CONTENT 5 | UNKNOWN | UNKNOWN | — |
| | 1 3 | CONTENT 6 | UNKNOWN | UNKNOWN | — |
| PAGE OBJECT | 4 | PAGE A | 1 | — | 3. 5. 7 |
| | 1 1 | PAGE B | 2 | — | UNKNOWN |
| PAGE LIST OBJECT | 9 | PAGE LIST | — | 4. 11 | — |

| OBJECT TYPE | OBJECT No. | OBJECT ID NAME | PAGE No. | PAGE OBJECT No. | CONTENT OBJECT No. |
|---|---|---|---|---|---|
| CONTENT OBJECT | 1 | CONTENT 1 | 2 | 1 1 | — |
| | 3 | CONTENT 2 | 1 | 4 | — |
| | 5 | CONTENT 3 | 1 | 4 | — |
| | 7 | CONTENT 4 | 1 | 4 | — |
| | 8 | CONTENT 5 | 2 | 1 1 | — |
| | 1 3 | CONTENT 6 | 2 | 1 1 | — |
| PAGE OBJECT | 4 | PAGE A | 1 | — | 3. 5. 7 |
| | 1 1 | PAGE B | 2 | — | 1. 8. 1 3 |
| PAGE LIST OBJECT | 9 | PAGE LIST | — | 4. 11 | — |

IMAGE FORMING DEVICE, IMAGE FORMING PROGRAM, COMPUTER READABLE RECORDING MEDIUM ON WHICH THE PROGRAM IS RECORDED, AND IMAGE FORMING METHOD

This application is based on Japanese Patent Application No. 2002-372354 filed on Dec. 24, 2002, and 2003-117132 filed on Apr. 22, 2003, the contents of which are hereby incorporated by reference.

BACKGROUND OF THE INVENTION

1. Field of the Invention

The invention relates to an image forming device, in particular, an image forming device for receiving a document file and forming images of said document file, wherein said document file contains objects for displaying a part or all of the contents of each page of the document and being capable of lining up in the file regardless of the order of said contents displayed in said document.

2. Description of Related Art

A personal computer ("PC") is capable of transmitting a document file stored in, for example, a hard disk to a printer via a network such as LAN.

In this case, the document file is transmitted after being converted into print data described in a printer-recognizable PDL (Page Description Language) such as PS (PostScript®).

On the other hand, PDF (Portable Document Format) files are widely used being distributed over the Internet as a type of document file that can be reproduced in the same style as the original document regardless of the types of the OS (Operating System) or application. A PDF file contains objects for displaying a part or all of the contents of each page of a document, wherein said objects can line up within the file not necessarily according to the order of the contents displayed in the document and the document structure can be analyzed by referring to the positional information of said object within the file, the information about which objects are used to display which contents of each page, and the like.

In the meanwhile, a PDF file may contain several hundreds of data. When such a large PDF file is converted into print data by a PC, the load on the PC can be enormous due to the reason that it takes a long time to convert, requires a complicated process, it takes a long time to transmit the data as the data size increases as a result of the conversion, etc. In order to lighten the PC's load, printers that are capable of directly printing a PDF file transmitted directly from a PC without the conversion ("PDF direct printing") have been proposed.

However, since a PDF file contains objects for displaying the contents of each page lining up in the file regardless of the order of said contents displayed in a document and also the reference information of the objects' positions in the file is located at the end of the file, a printer cannot start printing until after the entire PDF file is received. Consequently, such a printer sometimes ends up being unable to print a PDF file as it cannot receive the entire file due to the limitation of its memory capacity (usable capacity or vacant capacity) in some cases.

In order to cope with this problem, devices that are capable of modifying and reconstituting the contents of a PDF file in order to display the data in the order of receipt without having to receive the entire PDF file have been proposed (U.S. Pat. No. 6,067,553).

However, in case of the abovementioned device, it still requires a complicated process for reconstituting a PDF file on the transmission side, such as a PC, prior to the file transfer. Therefore, the technology in the above device has a problem that it does not reduce the load on the PC compared to converting PDF files into print data described in PDL such as PS. Moreover, the abovementioned technology is basically a technology of displaying on display units so that it does not take much consideration in printing on printers.

SUMMARY OF THE INVENTION

The present invention was made in order to solve the abovementioned problem of the prior art and is intended to provide an image forming device capable of directly receiving document files such as PDF files and forming images even if the memory device's usable capacity is limited.

Said objective of the present invention can be accomplished by the following means:

(1) An image forming device for receiving a document file and forming images of said document file, wherein said document file contains objects for displaying a part or all of the contents of each page of the document and being capable of lining up in the file regardless of the order of said contents displayed in said document, comprising: a receiving unit for successively receiving constituent data of said document file; a storing unit for successively storing said objects contained in said constituent data received by said receiving unit; a judging unit for judging whether all objects necessary for displaying a specific page are stored in said storing unit; and an image forming unit for forming images of said specific page when it is judged by said judging unit that all objects necessary for displaying said specific page are stored in said storing unit.

(2) An image forming program for receiving a document file and forming images of said document file, wherein said document file contains objects for displaying a part or all of the contents of each page of the document and being capable of lining up in the file regardless of the order of said contents displayed in said document, said image forming program causing an image forming device to execute: a receiving step for successively receiving constituent data of said document file; a storing step for successively storing into a storing unit said objects contained in said constituent data received by said receiving step; a judging step for judging whether all objects necessary for displaying a specific page are stored in said storing unit; and an image forming step for forming images of said specific page when it is judged by said judging step that all objects necessary for displaying said specific page are stored in said storing unit.

(3) A computer readable recording medium on which the image forming program as set forth in (2) is recorded.

(4) An image forming method for receiving a document file and forming images of said document file, wherein said document file contains objects for displaying a part or all of the contents of each page of the document and being capable of lining up in the file regardless of the order of said contents displayed in said document, comprising: a receiving step for successively receiving constituent data of said document file; a storing step for successively storing into a storing unit said objects contained in said constituent data received by said receiving step; a judging step for judging whether all objects necessary for displaying a specific page are stored in said storing unit; and an image forming step for forming images of said specific page when it is judged by said judging step that all objects necessary for displaying said specific page are stored in said storing unit.

(5) An image forming device for receiving a document file and forming images of said document file, wherein said document file contains objects for displaying a part or all of the contents of each page of the document and being capable of lining up in the file regardless of the order of said contents displayed in said document, comprising: a receiving unit for successively receiving constituent data of said document file; a storing unit for successively storing said objects contained in said constituent data received by said receiving unit; an image forming unit for forming images of said objects stored in said storing unit either singly or in combination of two or more of them regardless of the order displayed in said document.

(6) An image forming program for receiving a document file and forming images of said document file, wherein said document file contains objects for displaying a part or all of the contents of each page of the document and being capable of lining up in the file regardless of the order of said contents displayed in said document, said image forming program causing an image forming device to execute: a receiving step for successively receiving constituent data of said document file; a storing step for successively storing into a storing unit said objects contained in said constituent data received by said receiving step; an image forming step for forming images of said objects stored in said storing unit either singly or in combination of two or more of them regardless of the order displayed in said document.

(7) A computer readable recording medium on which the program as set forth in (6) is recorded.

(8) An image forming method for receiving a document file and forming images of said document file, wherein said document file contains objects for displaying a part or all of the contents of each page of the document and being capable of lining up in the file regardless of the order of said contents displayed in said document, comprising: a receiving step for successively receiving constituent data of said document file; a storing step for successively storing into a storing unit said objects contained in said constituent data received by said receiving step; an image forming step for forming images of said objects stored in said storing unit either singly or in combination of two or more of them regardless of the order displayed in said document.

BRIEF DESCRIPTION OF THE DRAWINGS

FIG. 11 is a diagram showing an example of offset information control table.

FIG. 12 is a diagram showing an example of page information control table.

FIG. 13 is an example of information contained in a typical object transmission request.

FIG. 21 is a diagram showing the registration status of an object information table when printer 20B causes a memory overflow while printer 20B is receiving PDF file 42 from PC 10B.

FIG. 22 is a diagram showing the registration status of an object information table when printer 20B causes a memory overflow while printer 20B is receiving PDF file 42 from PC 10B.

FIG. 28 is a diagram showing the registration status of an object information table when printer 20C causes a memory overflow while printer 20B is receiving PDF file 42 from PC 10B.

FIG. 29 is a diagram showing the registration status of an object information table when printer 20C causes a memory overflow while printer 20B is receiving PDF file 42 from PC 10B.

FIG. 30 is a diagram showing the registration status of an object information table when printer 20C causes a memory overflow while printer 20B is receiving PDF file 42 from PC 10B.

DESCRIPTION OF THE PREFERRED EMBODIMENTS

The embodiments of the present information will be described below with reference to the accompanying drawings.

Figure 1:
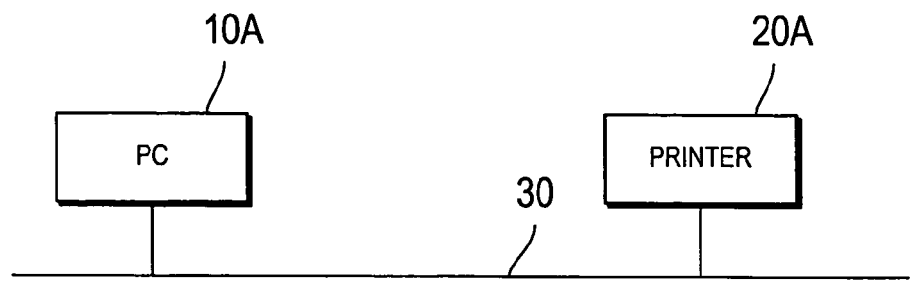
FIG. 1 is a block diagram showing the entire constitution of an image processing system using an image forming device according to a first embodiment of the present invention.

FIG. 1 is a block diagram showing the entire constitution of an image processing system using an image forming device according to a first embodiment of the present invention. As shown in FIG. 1, the image forming process system according to the present embodiment is equipped with a PC 10A as an image forming device as well as a printer 20A as an image forming device, which are connected communicably with each other via a network 30.

The types and the number of equipment to be connected to the network are not limited to those shown in FIG. 1. Also, PC 10A and printer 20A can be connected directly (local connection) without recourse to network 30.

Figure 2:
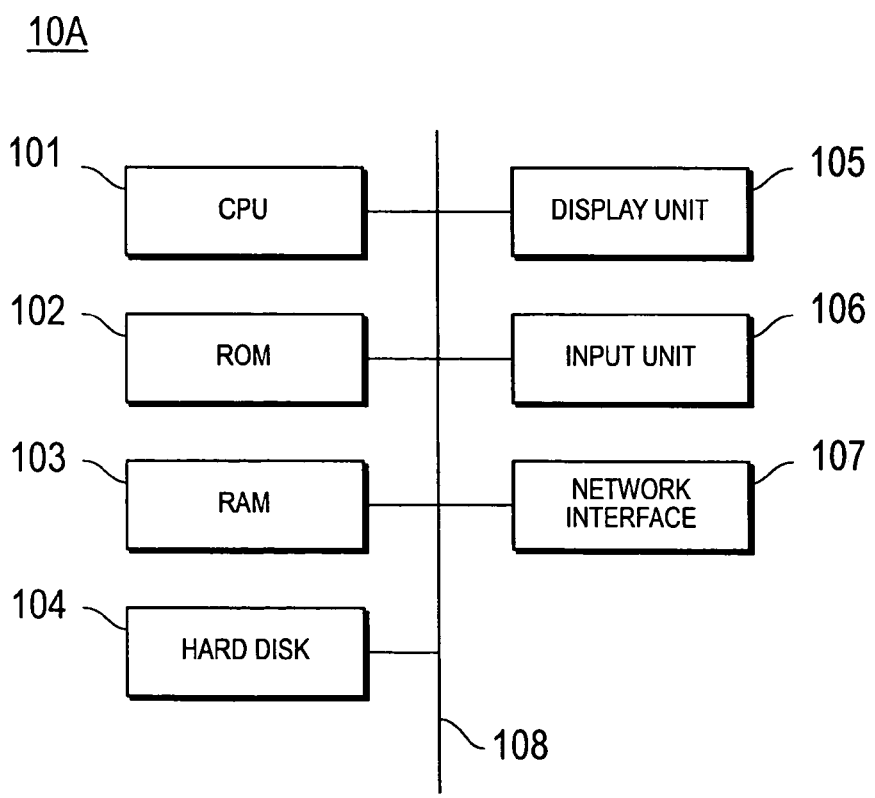
FIG. 2 is a block diagram showing the constitution of a printer 10A shown in FIG. 1.

FIG. 2 is a block diagram showing the constitution of PC 10A shown in FIG. 1. As shown in FIG. 2, PC 10A contains a CPU 101 for controlling the entire device and executing various computations, a ROM 102 for storing programs and data, a RAM 103 for storing the program and the data temporarily as a working area, a hard disk 104 as an external memory unit for storing various programs and data, a display unit 105 such as a liquid crystal display for displaying various information, an input unit 106 consisting of a keyboard, a mouse, etc., for entering various instructions, and a network interface 107 such as a LAN card for connecting to the network 30, all of which are interconnected via a bus net 108 for exchanging signals.

Figure 3:
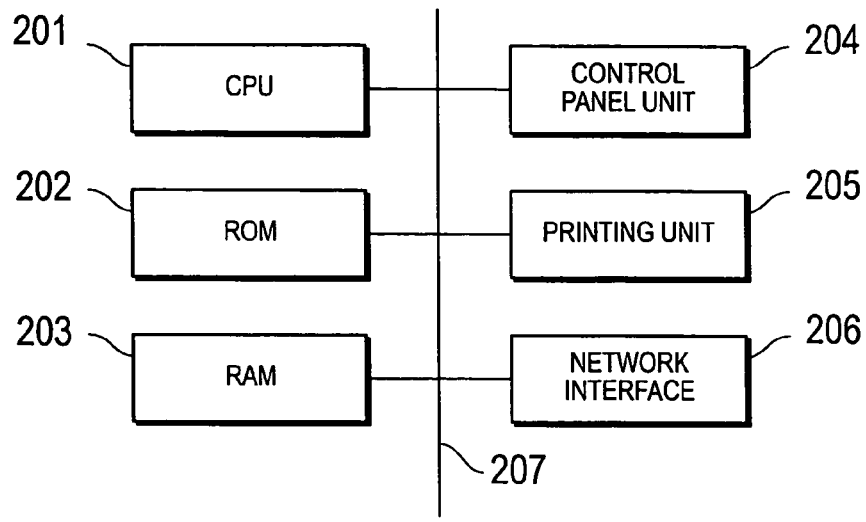
FIG. 3 is a block diagram showing the constitution of a PC 20A shown in FIG. 1.

FIG. 3 is a block diagram showing the constitution of printer 20A shown in FIG. 1. As shown in FIG. 3, printer 20A contains a CPU 201, a ROM 202, a RMA 203, an operating unit 204, a printing unit 205, and a network interface 206, all of which are interconnected by a bus 207" for exchanging signals. Of the constituting elements of printer 20A, those that have the identical functions as the constituting members of the PC 10A are not described here to avoid duplications.

RAM 203 can store the data received from PC 10A temporarily. ROM 202 can store font information concerning fonts of characters. Printer 20A can be equipped with a hard disk as an external memory unit for storing various programs and data. Operating panel 204 is used for displaying various information and entering various instructions. Printing unit 205 prints various data on a recording medium such as paper using a known image forming process such as an electronic photography type process.

Network 30 consists of a LAN based on standards such as Ethernet®, Token Ring, FDDI, etc., and a WAN consisting of LANs connected by a dedicated line.

PC 10A and printer 20A can contain constitutional elements other than those described above, or may not include a portion of the abovementioned elements.

In an image processing system according to the present embodiment, it is possible to use as the data communication protocol between PC 10A and printer 20A a particular protocol that is capable of bi-directional communications can be established for each job, and is capable of transmitting an arbitrary portion of the data in a file, for example, Raw (TCP/IP 9100), LPR (Line Printer Remote), IPP (Internet Printing Protocol), etc. However, it is also possible to use a proprietary protocol.

In an image processing system according to the present embodiment, both conventional printing and PDF direct printing are executable. If the conventional printing is in process, a file being processed for printing is first converted into print data described in a page description language by the printer driver of PC 10A and then is transmitted to printer 20A. On the other hand, if the PDF direct printing is in process, a PDF file being processed for printing is, without being converted into print data by PC 10A, transmitted from PC 10A to printer 20A by means of the PC 10A's dedicated software. With reference to the present embodiment, the process of PDF direct printing, which is the main feature of the invention, will be described below.

Figure 4:
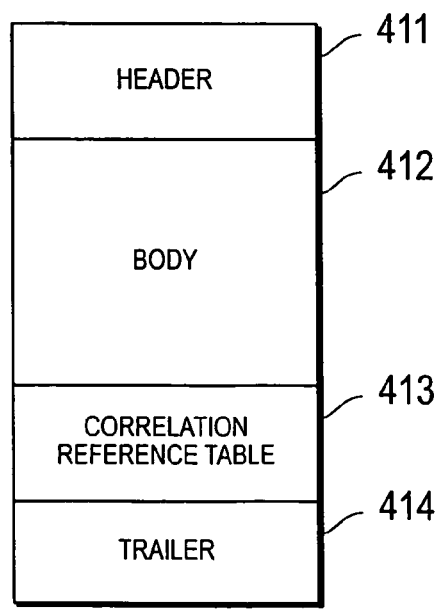
FIG. 4 is a diagram for illustrating a typical PDF file.
Figure 5:
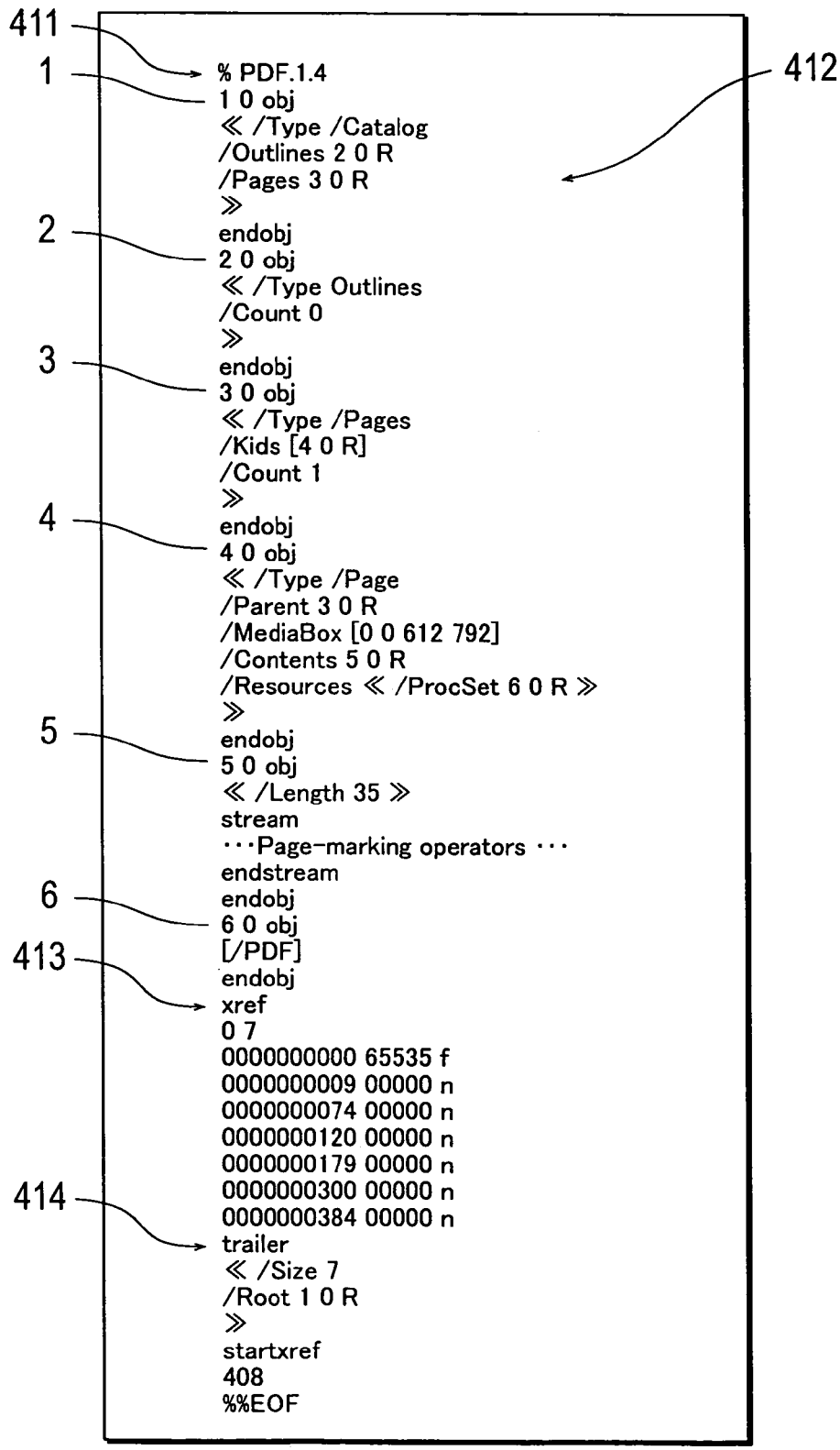
FIG. 5 shows a sample of the PDF file.

Next, the structure and the analyzing method of a typical PDF file will be described with reference to FIG. 4 and FIG. 5. FIG. 4 is a diagram for describing the constitution of a typical PDF file, and FIG. 5 is a sample of PDF file. FIG. 4 and FIG. 5 are prepared using "PDF Reference Third Edition Adobe Portable Document Format, Version 1.4" (Adobe Systems Incorporated) as a reference.

As can be seen from FIG. 4 and FIG. 5, a typical PDF file 41 consists of a header 411, a body 412, a correlation reference table 413, and a trailer 414.

The header 411 contains a comment that starts with %. From the header 411 shown in FIG. 5, one can see that the file's format is PDF, and the version (1.4 in this case) of the PDF specification.

Body 412 consists of a plurality of objects (objects 1 through 6 in case of FIG. 5). The objects are individual elements that constitute a document.

For example, the first object 1 is defined by the description from "10 obj" to "endobj" and other objects are also defined in a similar manner. Here, the first numeral and the second numeral in "10 obj" represent the (ID) number and the generation number of an object.

Objects can be a catalog object, page list object, page object, content object, resource object, font object, font information object, etc.

A catalog object is an object that serves as a route for object hierarchical structure of the PDF file. In a catalog object, the "/Type" attribute of the object is "/Catalog" and a page list object is referenced by the "/Pages" attribute.

The page list object is an object having a page list of the PDF files referenced by the catalog object. The "/Type" attribute of the page list object is "/Pages" and shows the number of page objects contained in said PDF file, i.e., the number of pages of said PDF file with the help of the "/Count" attribute. Also, each page object is referenced to and the page order of each page object, i.e., the page number of the document which the page being indicated by each page object corresponds to, is indicated as well with the help of the "/Kids" object.

The page object is an object that describes information necessary to constitute a specific page referenced by the page list object. The "/Type" attribute of the page object is "/Page" where the content object is referenced by the "/Contents" attribute.

The content object is an object that contains the contents of a specific page referenced by the page object, i.e., an object that includes contents stream where instructions and data for displaying characters, graphics and images are written. In other words, the content object contains data for displaying characters, graphics and images, i.e., text data, vector data, raster data and the like, as well as a coordinate system specifying positions and sizes of the characters, graphics and images, and various instructions such as an instruction for color designations.

The resource project is an object that describes information defining the operator, font, color space used in the specific page referenced by the page object, and information on images, patterns, etc., common to multiple pages, whereas the font object is an object that describes the font definition and the font information object is an object that describes geometric information such as the width, height, etc. of the font.

In FIG. 5, an object 1 is a catalog object, an object 3 is a page list object (in case of FIG. 5, the document consists of a single page), an object 4 is a page object, an object 5 is a content object, and an object 6 is a resource object.

Correlation reference table 413 is reference information that indicates the position of the object within a PDF file. The position of each object is indicated by an offset in correlation table 413. The offset is the number of bytes that exist between the head of the file and the head of the data in attention. This makes it possible to access the objects lined up in body 412 at random. Correlation reference table 413 starts with a key word named "xref" in the PDF file.

Trailer 414 is information to be accessed at the startup of the PDF file analysis. More particularally, the location information of correlation reference table 413 in the PDF file and the number of an object that needs to be referenced first (a root object to be the root of the hierarchical structure, i.e., a catalog object) will be described in trailer 414. In other words, the number indicated next to "startxref" is the offset of correlation reference table 413 and the route object is indicated by the "/Root" attribute. Also, the "/Size" attribute indicates the number of objects existing in the file including the first entry (the ID number of the object is "0") of correlation reference table 413. Trailer 414 exists in the end of the file and starts with a row that includes a key word named "trailer."

The device for analyzing a PDF file, when it analyzes typical PDF file, analyzes trailer 414 that exists at the end of the file first, and then analyzes correlation reference table 413. Based on the information obtained in these analyses, it can analyze the contents of the page described in body 412. The object contains the number of another object where the data that is required next is described. Consequently, by tracing the number of the object required next, the total analysis of the PDF file becomes possible. Therefore, the objects can be described in the body of the PDF file in an arbitrary order and consequently be arranged in the file in an order regar the order in the document.

Figure 6:
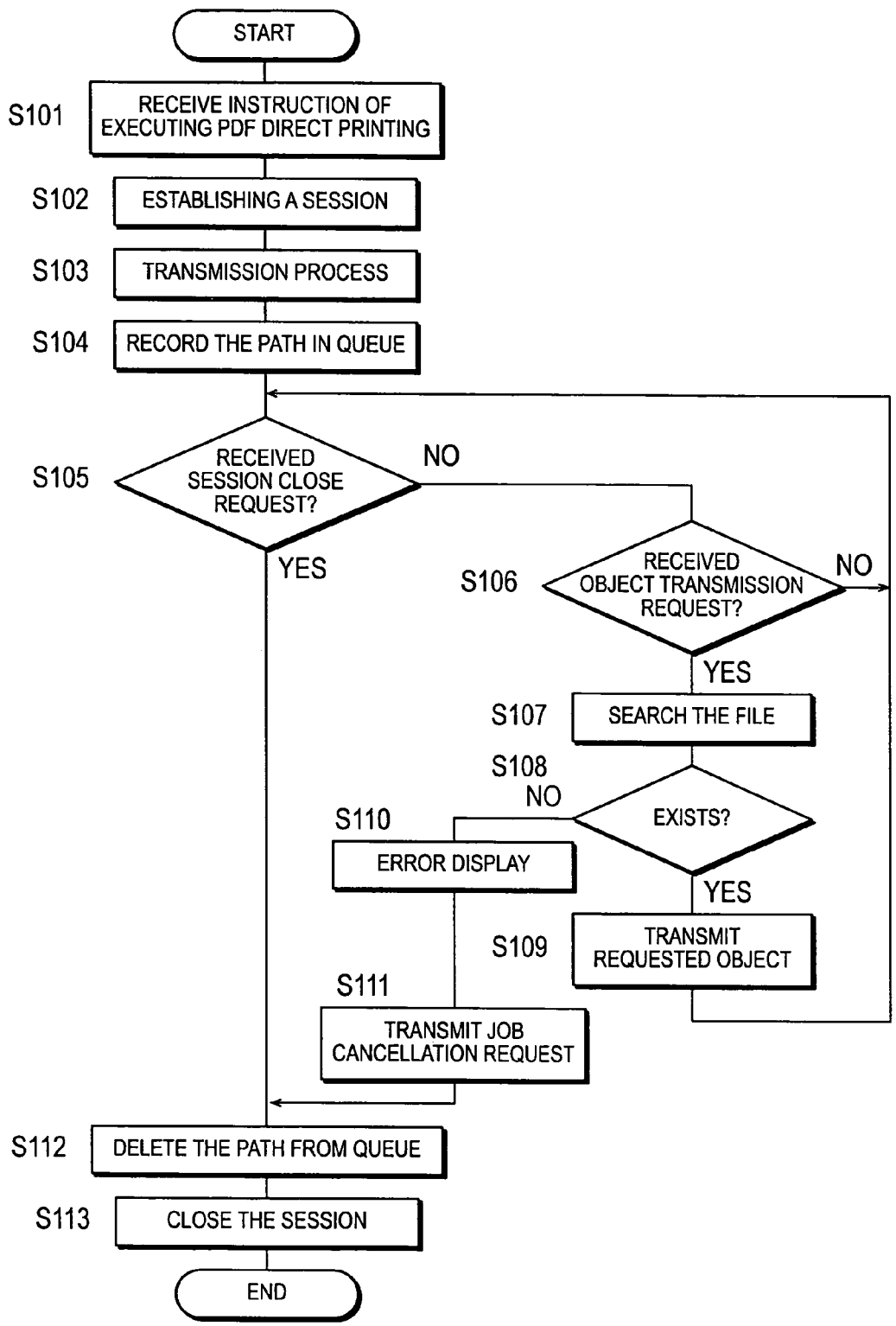
FIG. 6 is a flowchart showing the procedure of image processing by means of PC 20A.
Figure 7:
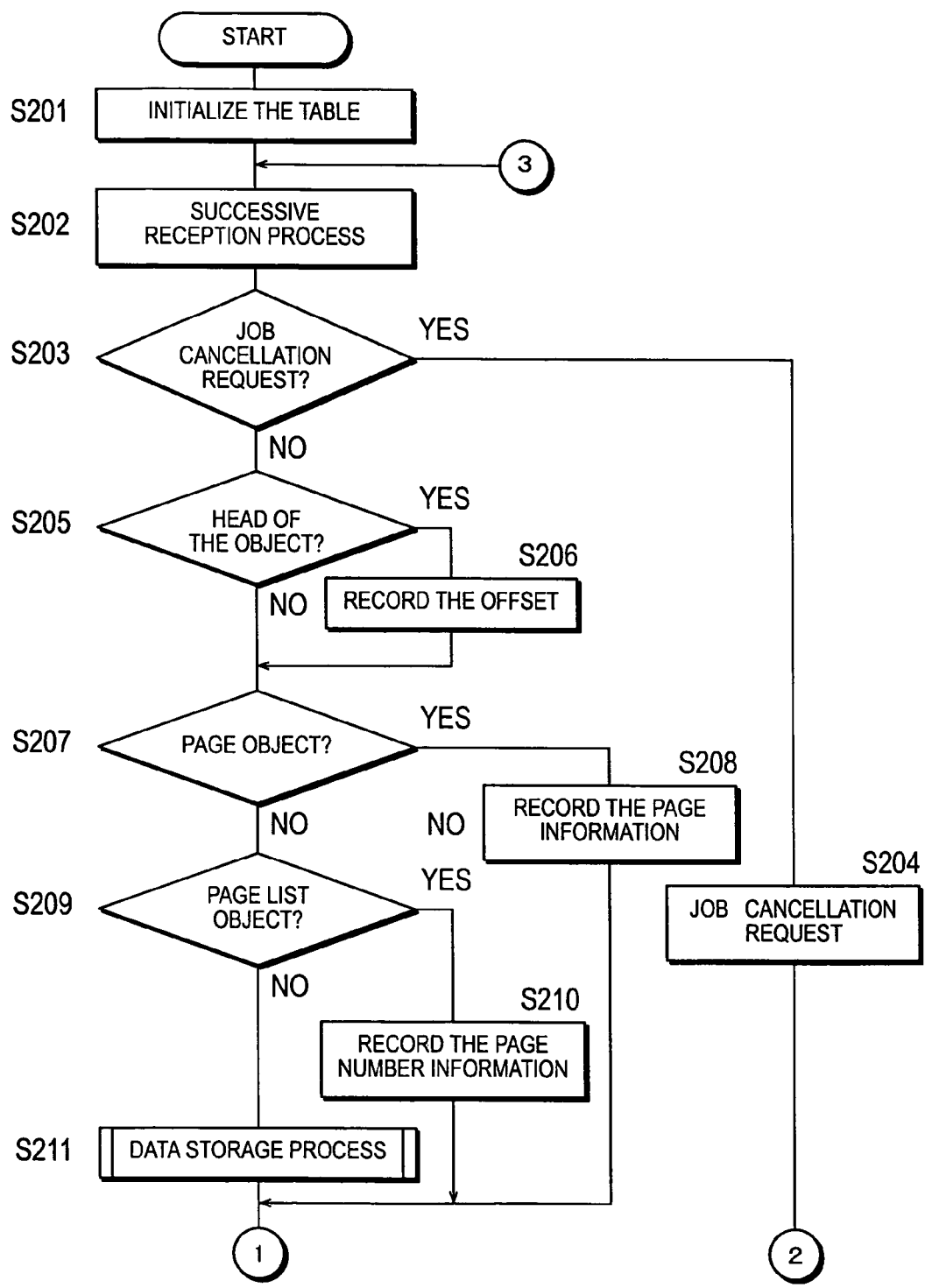
FIG. 7 is a flowchart showing the procedure of image forming process by means of printer 10A.

Next, the outline of the operation of the image processing system in the present embodiment will be described. FIG. 6 is a flowchart showing the image process of PC 10A according to this embodiment. The algorithm shown in the flowchart of FIG. 6 is stored as a program in a memory unit such as a hard disk 104 of PC 10A and executed by CPU 101.

Before the user instructs a PDF direct printing execution on PC 10A, an initial setup is performed. The initial setup includes the setup of the output printer and the setup of the printing condition. The output printer and the printing condition are set up based on the user's operation through input unit 106. The printing condition included the attributes related to the printing order of the page. More particularally, the printing condition includes, for example, the number of copies to be printed, the instruction for single side or double side printing, the instruction for collation in order to make it possible to output by each copy, and the instruction for normal order printing (printing successively from the first page toward the last page of the file) or not necessarily requiring normal order printing. However, the printing condition may include other attributes or omit a portion of the above mentioned attributes. The printing condition can also be set up on printer 20A through operating panel unit 104.

After the initial setup is completed, PC 10A accepts the user's execution instruction for PDF direct printing of the PDF file (S101). An icon for the application program file of the PDF direct printing is displayed on the desktop of PC 10A. The user can specify the PDF direct printing by activating the application program by dragging and dropping the PDF file to be printed on said icon. The execution of the PDF direct printing can be specified by other means.

Next, the session between PC 10A and destination printer 20A is established automatically (S102). The session is maintained until it is closed in a step S113, which is to be described later.

The PDF file for the PDF direct printing is transmitted to printer 20A (S103). At this time, PC 10A transmits the PDF file as is without processing it at all. The preset printing condition is also transmitted to printer 20A.

The transmitted PDF file's path is recorded on the queue after the PDF file is transmitted (S104). The path is a character string indicating the file's storage place and includes the names of the drive and the directory where the file is stored. The queue is a temporary storage area of the path for the PDF direct printing.

In step S105, a judgment is made as to whether a session close request, which is a request for closing a session, is received from printer 20A. If a session close request is received (S105: Yes), the program advances to step S112.

If a session close request is not received (S105: No), a judgment is made as to whether a transmission request for the specified object is received from printer 20A (S106) If no object transmission request is received (S106: No), the program returns to step S105.

When an object transmission request is received (S106: Yes), a PDF file containing said object is searched (S107). At this point, the path located at the head of the queue is referenced and the search for the PDF file designated by the path is performed. Then, a judgment is made as to whether the searched PDF file exists (S108).

If the PDF file is found (S108: Yes), the requested object is extracted from said PDF file and transmitted to printer 20A (S109), and returns to step S105. The object transmission request from printer 20A contains the offset and size information of said object as mentioned later. Therefore, the extraction of the object from PDF file is performed based on the information of the offset and size.

On the other hand, if the searched PDF file is not found (S108: No), a specified error display is displayed on display unit 105 to notify the user that an error occurred (S110). Next, a job cancel request, which is a request for canceling the job of said PDF direct printing, is transmitted to printer 20A (S111).

In step S112, the path located at the head of the queue is deleted to close the session being held (S113).

Next, the image forming process in printer 20A will be described below referring to FIG. 7 through FIG. 10. The algorithm shown in the flowcharts of FIG. 7 through FIG. 10 is stored as a program in a memory unit such as a ROM 202 of printer 20A and executed by CPU 201.

First, printer 20A initializes the tables shown in FIG. 11 and FIG. 12 used in this application (S201). FIG. 11 shows an offset information control table for controlling the offset of each object, and FIG. 12 is a page information control table for controlling the object numbers related to each page. The contents of these tables and how they are used will be described later.

When the initialization of the tables is completed, printer 20A receives PDF files transmitted from PC 20A in sequence and analyzes the received data (S202).

In step S203, a judgment is made as to whether the received data is a job cancel request. If it is a job cancel request (S203: Yes), the job for conducting said PDF direct printing is cancelled (S204), and terminates the execution of the application. If it is not a job cancel request (S203: No), the program advances to step S205.

In step S205, a judgment is made as to whether the received data is at the head of the object. If it is at the head of the object (S205: Yes), the program advances to step S206; if not (S205: No), it advances to step S207.

In step S206, the offset of the object in attention is recorded. The offset of said object is obtained by counting the number of bytes existing between the head of the file and the head of said object. More particularally, the number of the corresponding object and its offset are recorded on the offset information control table as shown in FIG. 11. The deletion flag shown in FIG. 11 is a flag that turns to "1" when the deletion of a specific object is completed in step S303 to be described later.

In step S207, a judgment is made as to whether the received data is a page object. If it is a page object (S207: Yes), the program advances to step S208; if not (S207: No), it advances to step S209.

In step S208, the page information of the page object in attention is recorded. More particularally, the page object number and the object number necessary for constituting the corresponding page are extracted from the page object inattention, and are recorded in the page information control table as shown in FIG. 12.

In step S209, a judgment is made as to whether the received data is a page list object. If it is a page list object (S209: Yes), the program advances to step S210; if not (S209: No), it advances to step S211.

In step S210, the page number information of the page list object is recorded. More particularally, the number of each page object and the page number corresponding to said page object are obtained by analyzing the page list object, and are recorded on the page information control table as shown in FIG. 12.

As a result of the processing in steps S208 and S210, columns other than the output flag column on the page information control table are made. The output flag shown in FIG. 12 is a flag which turns to "1" when a page complete with all the necessary objects is outputted to printing unit 205.

Since each cell of the offset information control table and the page information control table is filled up as each object is analyzed, each piece of information is not necessarily displaced in the order of object numbers or the order of pages (refer to FIG. 11 and FIG. 12). However, it is possible to control in such a way that information is laid out in the order of object numbers in the offset information control table, or information is laid out in the order of pages in the page information control table.

In step S211, the data storage process is performed. In other words, a storage process is conducted for data that are neither page object nor page list object among the received data.

Figure 9:
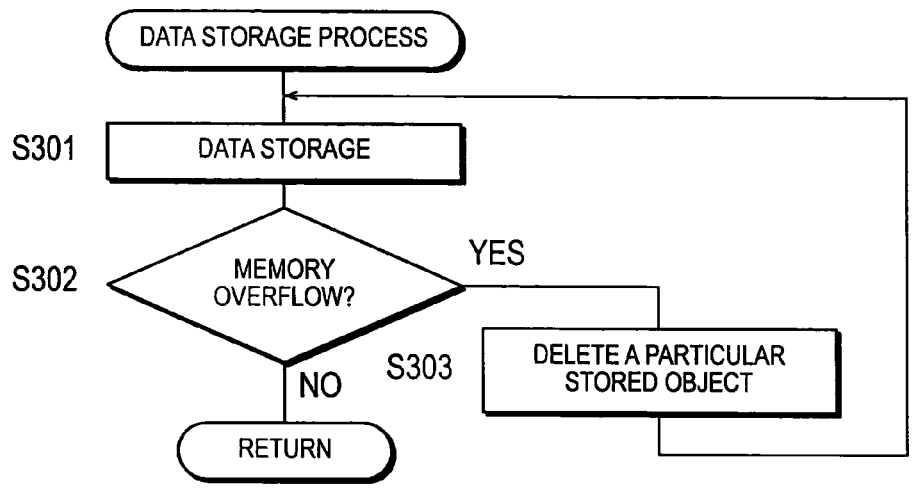
FIG. 9 is a flowchart showing the procedure of data storing process by means of printer 10A.

As shown in FIG. 9, the received data is stored in the prescribed storage area of memory (RAM 203) in the data storage process so long as it is possible to store it (S301).

Next, a judgment is made as to whether the usage amount of the memory unit has exceeded the prescribed limit. In this case, a judgment is made whether a memory overflow has occurred (S302). A memory overflow is a condition where the specific storage area of the memory is filled up with data and is not capable of storing data anymore. The specified limit storage amount does not necessarily correspond to the full usage of the specific storage area of the memory, but also can be set up arbitrarily to any ceiling such as 80% of the full capacity.

If a memory overflow occurs (S302: Yes), the specific object already stored in the memory is deleted (S303). This makes it possible to secure a vacant space for storing an object which has not been stored, thus guaranteeing a more secure way of storing PDF files. It is possible to avoid wasting the process time that may otherwise caused by frequent deletion processes by deleting a specified object(s) only when a memory overflow occurs.

The specific object to be deleted is an object that is not necessary for output processing of another page whose output process has not been completed, among objects that constitute a page whose output process for outputting it to printing unit 205 (refer to S213) is completed. This makes it possible to prevent the deterioration of the speed of the PDF direct printing by preventing any disturbance to the output process of other pages. The specified object to be deleted is not limited to the abovementioned object, but can be any other object that has a large data size. Also, the object that constitutes the first page among the pages whose output processes have not been completed should preferably be exempted from the target of deletion. It is because such a page should be outputted and printed quickly. It can also be constituted in such a way that multiple conditions are set up for selecting the objects to be deleted and a priority order is set up for the selection conditions so that the process is to be executed in sequentially according to said multiple selection conditions until no more memory overflow occurs.

In the present embodiment, printer 20A deletes the specified object only when a memory overflow occurs as described above. However, it canal so be constituted in such a way as to delete the object whose process for output to printing unit 205 (refer to S213) is completed regardless of whether a memory overflow occurs, unless it is required for the output process of another page whose output process has not been completed.

The deletion flag concerning the object whose deletion process is completed is set to "1" in the offset information control table shown in FIG. 11.

After the deletion of the specified object (S303), the program returns to step S301, and data storage is executed for the data that was not stored due to a memory overflow.

On the other hand, if there is no memory overflow (S302: No), the program returns to the flowchart of FIG. 7 and FIG. 8.

Figure 8:
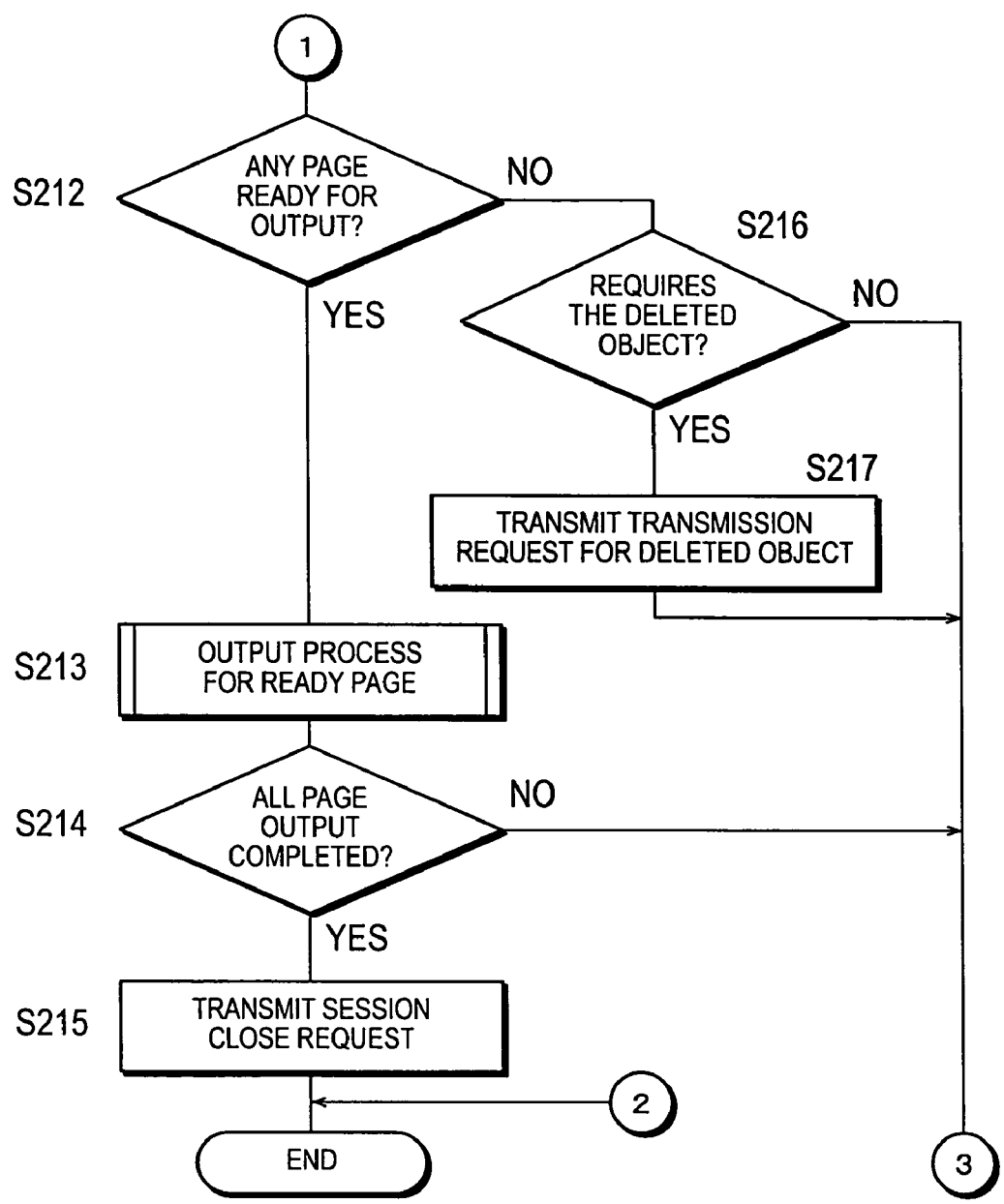
FIG. 8 is a flowchart showing the procedure of image forming process by means of printer 10A.

In step S212 of FIG. 8, a judgment is made as to whether there is any page that can be outputted to printing unit 205. In other words, a judgment is made as to whether all the objects that are needed to constitute a certain page are stored.

At this point, the offset information control table of FIG. 11 and the page information control table of FIG. 12 are referenced. More particularally, a judgment is made as to whether a page that has not been outputted (a page whose output flag shown in FIG. 12 is "0"), for which all the constituent objects (an object number column shown in FIG. 12) are stored, exists. A case where "all the constituent objects are stored" means a case where the numbers and offsets of the corresponding objects are stored in the offset information control table shown in FIG. 11 and the deletion flag is "0."

If it is judged that a page ready for output exists (S212: Yes), the output process for said page is performed (S213)

Figure 10:
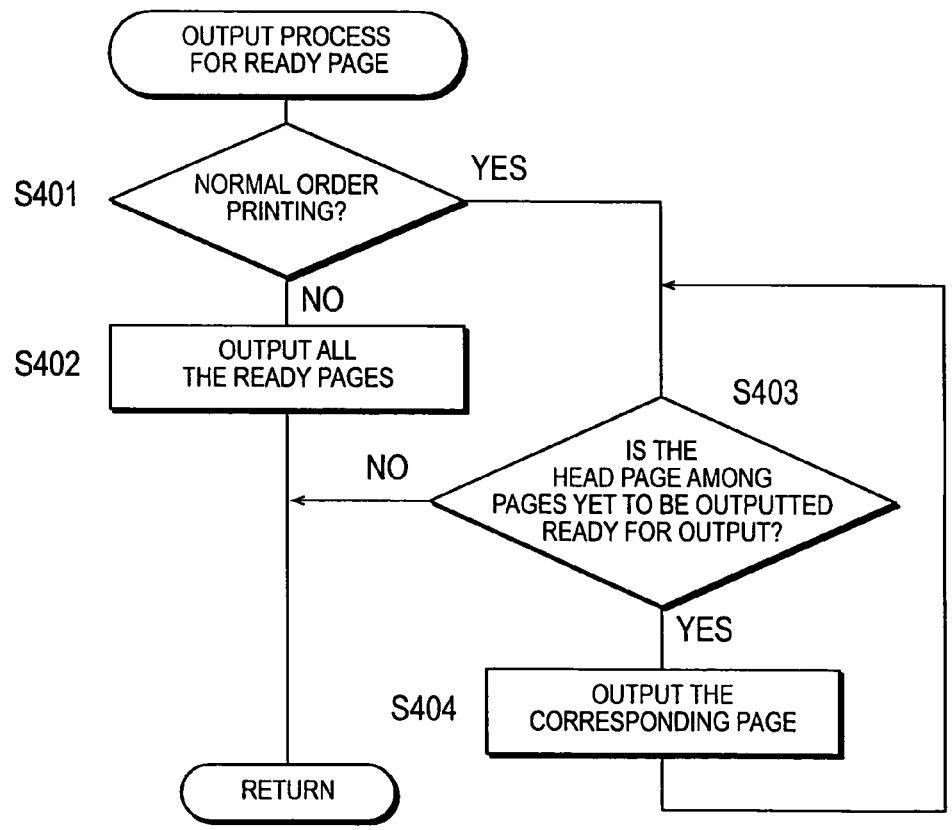
FIG. 10 is a flowchart showing the procedure of outputting process of pages that can be outputted by means of printer 10A.

As shown in FIG. 10, a judgment is made as to whether the normal order printing is specified by referring to the preset printing conditions (S401) and, if the normal order printing is not specified (S401: No), i.e., if it is instructed that printing does not necessarily have to be in the normal order, the page judged to be ready to be outputted to printing unit 205 in step S212 is outputted to printing unit 205 after rasterizing (S402) and is printed on paper. The output flag on the page information control table is then set to "1" for the page outputted in step S402. Therefore, it is possible to print a specific page when said page is ready to be outputted as a result of the fact that all the objects that constitute said page are stored although the entire PDF file has not been received.

On the other hand, if the normal order printing is specified (S401: Yes), a judgment is made as to whether the head page among pages, which have not been outputted to printing unit 205, is ready for output by referring to the tables of FIG. 11 and FIG. 12 (S403).

If the head page among the pages that are yet to be outputted is ready for output (S403: Yes), said page is outputted to printing unit 205 after rasterizing (S404), and is printed on paper. The output flag on the page information control table is then set to "1" for the page outputted in step S404. Therefore, it is possible to print the head page among the pages that are yet to be outputted, when said page becomes ready for output without having to wait for the entire PDF file to be delivered. Thus, the normal order printing is realized. After outputting said page to printing unit 205, the program returns to step S403. On the other hand, if the head page among the pages yet to be outputted is not ready for output (S403: No), the program returns to the flowchart of FIG. 8.

If it is judged that no page is ready for output in step S212 of FIG. 8 (S212: No), a judgment is made as to whether the object deleted in step S303 is necessary (S216) If it is shown by referencing the offset information control table shown in FIG. 11 that no page is ready for output because the specific object was deleted (the deletion flag is "1") in step S303, it is judged that the deleted object is necessary. If the deleted object is not necessary (S216: No), the program returns to step S202 of FIG. 7.

If the deleted object is necessary (S216: Yes), a transmission request for the deleted object is transmitted to PC 20A, which is the source of transmission of the PDF file (S217). Thus the PDF file printing becomes more secure.

At this point, printer 20A calculates the data size of the object being requested from the offset of the object being requested and the offset of the object that is to be displaced next in the file by referring to the offset information control table shown in FIG. 11. Printer 20A transmits to PC 20A the transmission request for the object that contains the offset and size of the object being requested. FIG. 13 is an example of information contained in a typical object transmission request. The object transmission request may contain other information such as the number of the object being requested and the IP address of printer 20A to which the object is to be outputted. The process of printer 20A returns to step S202 of FIG. 7 after requesting the deleted object.

In step S214, a judgment is made as to whether all the pages of the PDF file are outputted to printing unit 205 (S214). If all the output for all the pages is not yet completed (S214: No), the program returns to step S202 of FIG. 7, and the above process is repeated.

On the other hand, if the output for all the pages is completed (S214: Yes), a session close request is transmitted to PC 20A, which is the transmission source of the PDF file (S215).

In this embodiment, as can be seen from the above, printer 20A can store the objects contained in the PDF file transmitted from the PC successively, and conduct the printing process for a specific page when it judges that all the objects that constitute said page are stored.

Therefore, it is possible to print a specific page when said page is ready to be outputted as a result of the fact that all the objects that constitute said page are stored although the entire PDF file has not been received. Consequently, even a printer with a limited memory capacity can receive a PDF file to print it without tasking the transmission side heavily. Also, the normal order printing can be made possible by adopting a constitution that enables to print the head page among the pages yet to be outputted when said page becomes ready to be outputted.

Next, the second embodiment of the invention will be described below. PC 10B and printer 20B according to the present embodiment have constitutions identical to PC 10B and printer 10A of the first embodiment respectively (refer to FIG. 2 and FIG. 3), and are interconnected via a network 30 to be able to communicate with each other same as in the first embodiment (refer to FIG. 1).

Figure 14:
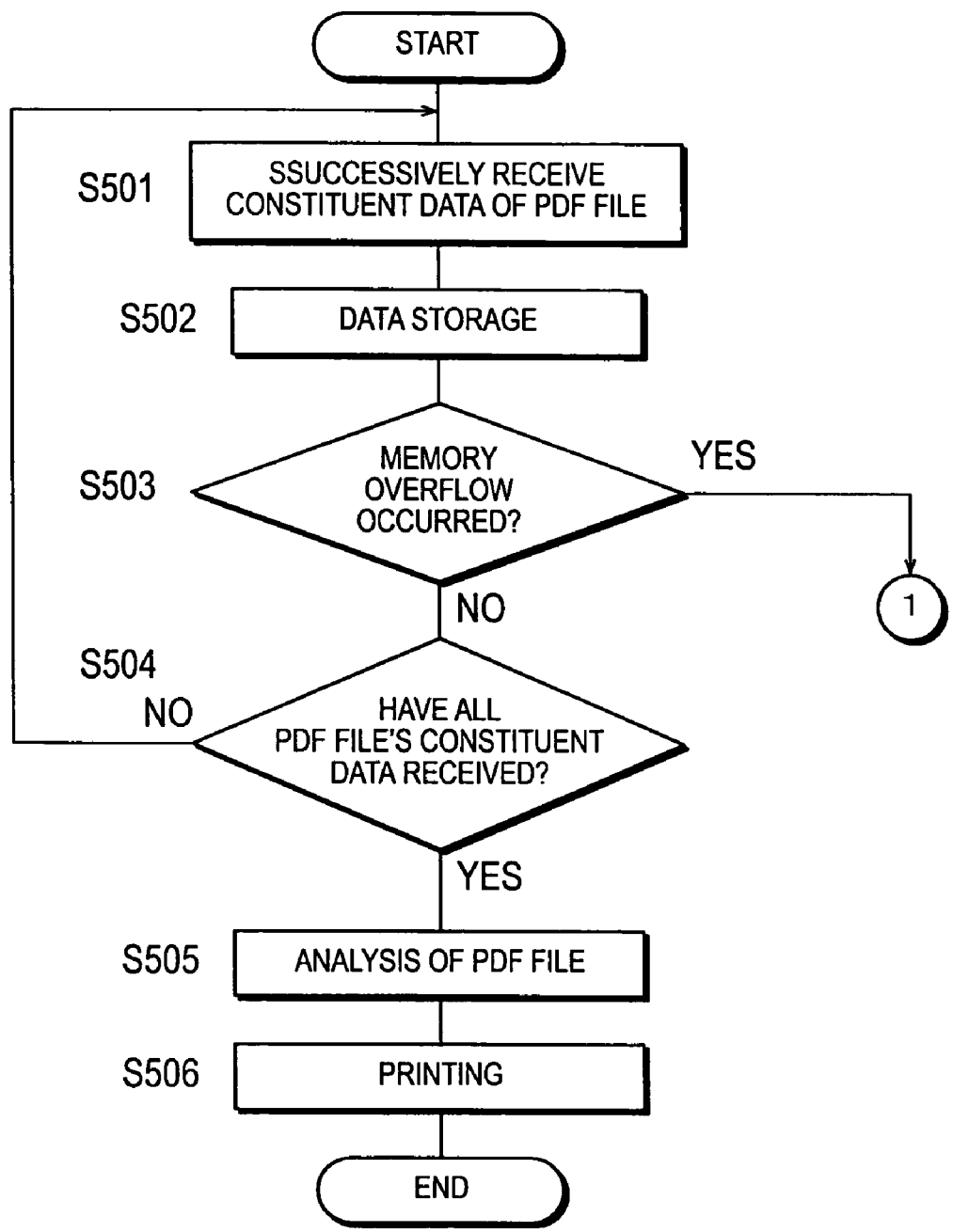
FIG. 14 is a flowchart showing the procedure of image forming process of a printer 20B concerning a second embodiment of the present invention.
Figure 15:
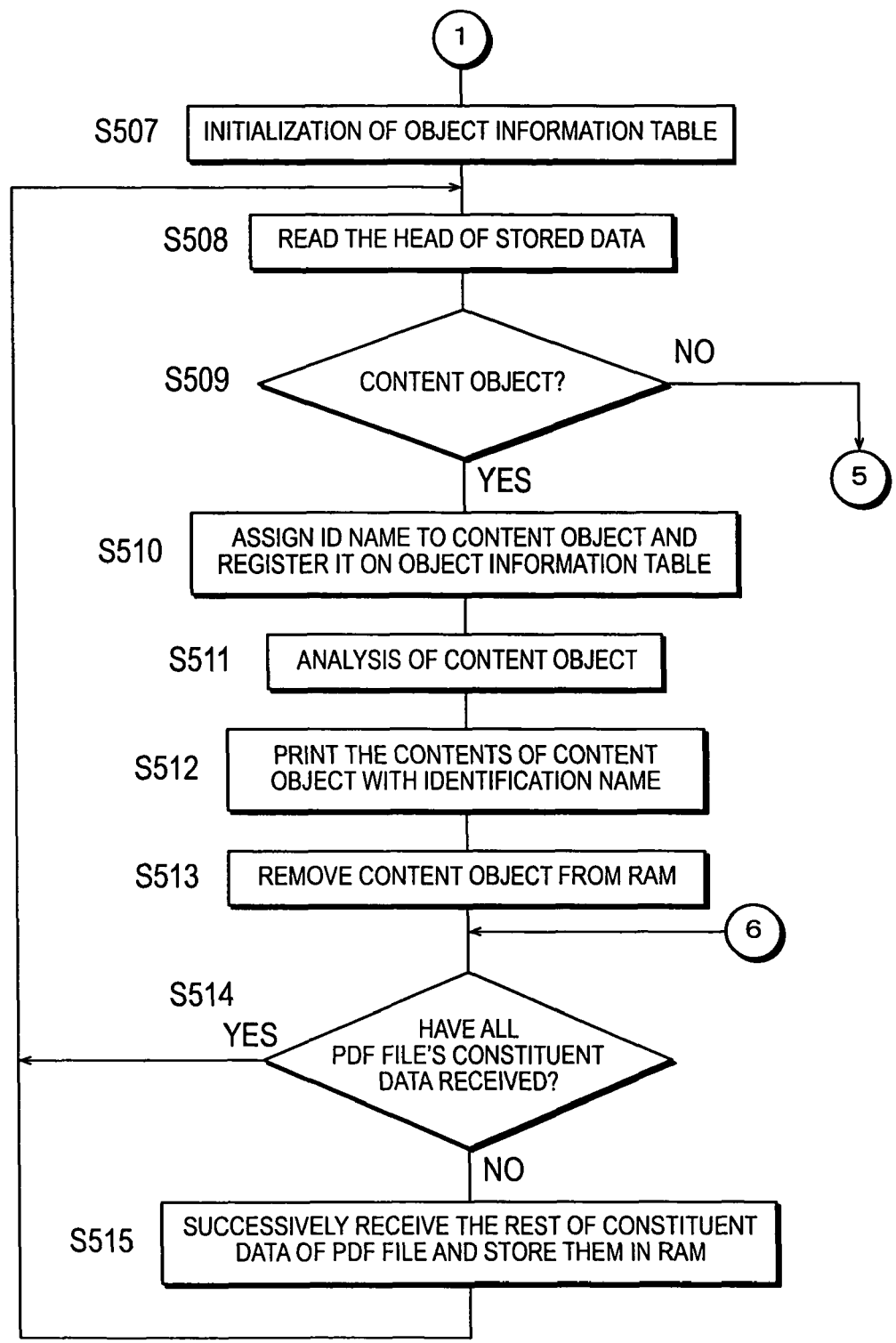
FIG. 15 is a flowchart showing the procedure of image forming process by means of printer 20B.
Figure 16:
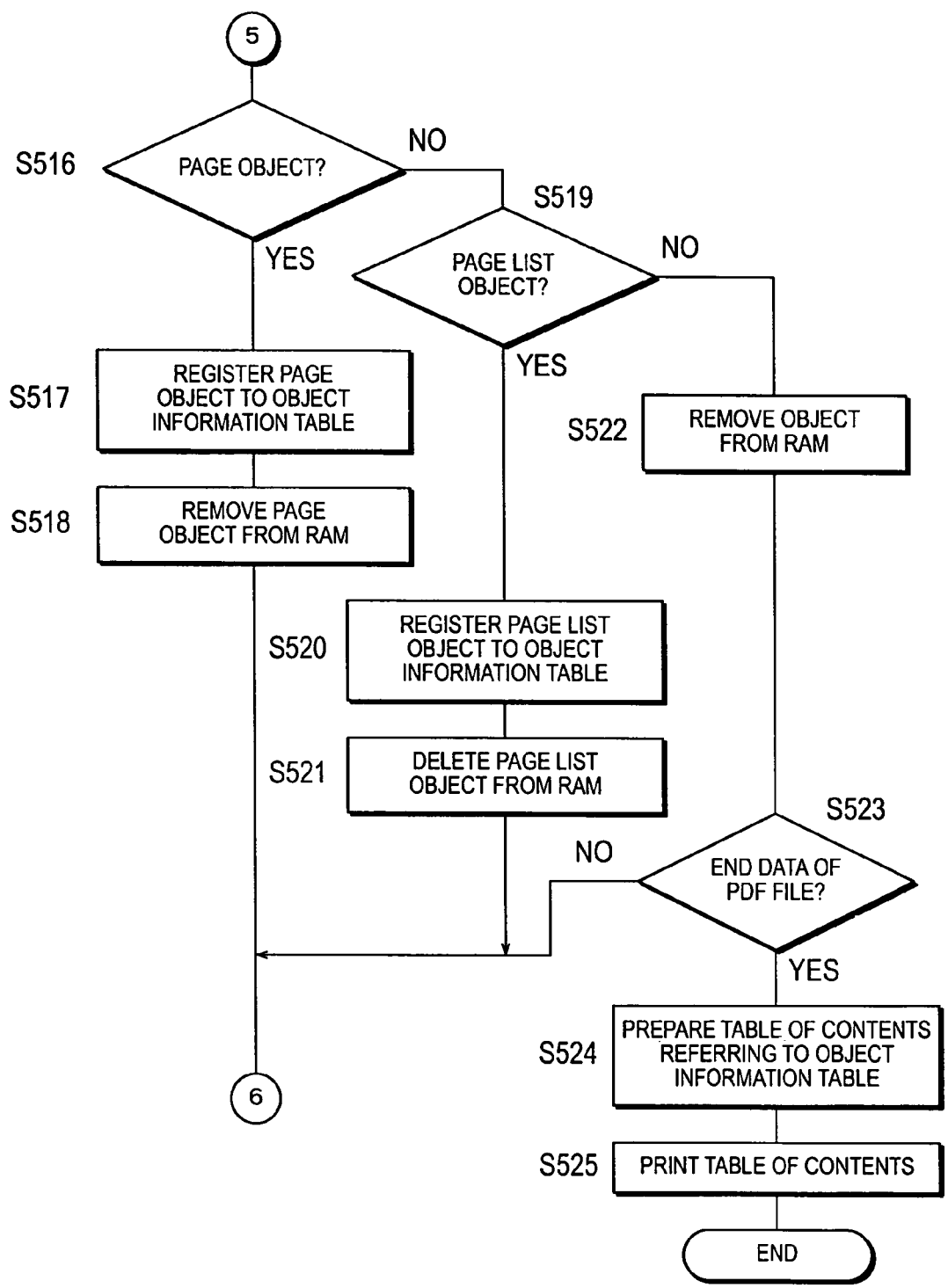
FIG. 16 is a flowchart showing the procedure of image forming process by means of printer 20B.

Next, the image forming process in printer 20B will be described below referring to FIG. 14 through FIG. 16. The algorithm shown in the flowcharts of FIG. 14 through FIG. 16 is stored as a program in a memory unit such as a ROM 202 of printer 20B and executed by CPU 201.

First, upon receiving a PDF direct printing execution instruction of the user, PC 10B transmits the constituent data of the PDF file to be printed to printer 20B successively. In FIG. 14, printer 20B receives the constituent data of the PDF file transmitted from PC 10B (S501), and stores the received data in RAM 203 (S502). It stores said constituent data in RAM 203 by repeating the receiving of said constituent data so long as no memory overflow occurs (S503: No; S504: No; S501 and S502) and, upon receiving all the constituent data (D503: No and S504: Yes), analyzes the PDF file stored in RAM 203 (S505), converts it to printing image (bitmap data) and outputs it for printing (S506).

If a memory overflow occurs while receiving the constituent data of the PDF file (S503: Yes), the program advances to step S507 and initializes the object information table. The object information table is a table for controlling various information of the object contained in the constituent data of the PDF file. The contents of and the method of using the object information table will be described later.

Next, it reads the head of the constituent data of the PDF file stored in RAM 203 up to that instance (S508), and if the retrieved data relates to the content object (S509: Yes), it assigns an identification name to said content object and registers the information of said content object to the object information table (S510). Next, it analyzes said content object (S511), converts it to a printing image, and outputs it for printing with its identification name (S512). It deletes then the data of said content object from RAM 203 (S513), and if not all of the constituent data of the PDF file have been received (S514: No), it receives the successive data to be stored in RAM 203 just enough to fill the capacity vacated by deleting the data of said content object (S515), and reads the head of the constituent data of the PDF file stored in RAM 203 again (S508). If all of the constituent data of the PDF file are received in step S514 (514: Yes), it reads the head of the remaining data stored in RAM 203 (S508).

If the data retrieved in step S508 concerns with the page object (S509: No and S516: Yes), it registers the information of said page object to the object information table (S517), deletes the data of said page object from RAM 203 (S518), and through the procedures of steps S514 and S515, it reads the head of the constituent data of the PDF file stored in RAM 203 again (S508).

Also, if the data retrieved in step S508 concerns with the page list object (S509: No; S516: No; and S519: Yes), it registers the information of said page list object to the object information table (S520), deletes the data of said page list object from RAM 203 (S521), and through the procedures of steps S514 and S515, it reads the head of the constituent data of the PDF file stored in RAM 203 again (S508).

On the other hand, if the data retrieved in step S508 does not concern with either the content object, page object, or page list object, in other words, it is data related to either an object other than the above objects (resource object, font object, etc.), a header, a correlation reference table, and a trailer (S509: No; S516: No; and S519: No), it deletes said data from RAM 203 (S522), while, if said data is not the end data of the PDF file (S523: No), through the procedures of steps S514 and S515, it reads the head of the PDF constitution data stored in RAM 203 again (S508). If the data deleted in step S522 is the end data of the PDF file (S523: Yes), it prepares a table of contents referring to the object information table (S524), and prints the prepared table of contents (S525) to end the image forming process.

Figure 17:
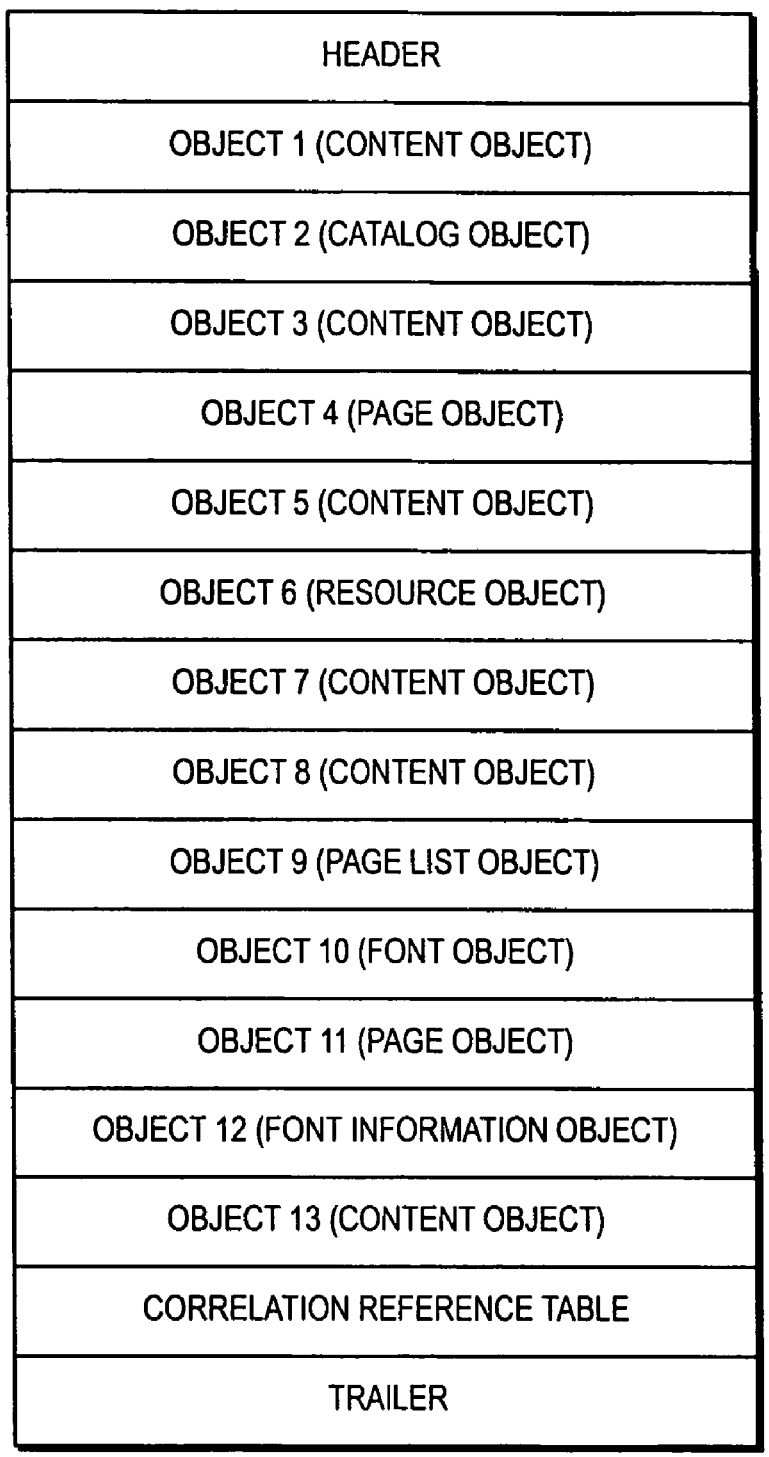
FIG. 17 is a diagram showing the structure of a PDF file 42 which is transmitted to printer 20B by a PC 10B.

Next, the procedures of the image forming process by printer 20B according to this embodiment will be described in more details referring to a concrete example. FIG. 17 is a diagram showing the structure of the PDF file, which PC 10B transmitted to printer 20B. In FIG. 17, it is assumed that PDF file 42 is constituted from the header to the trailer in the order shown. The numeral attached to each object contained in the body represents the object number (ID) and the parenthesized statement represents the type of the object.

Figures 18, 19, 20:
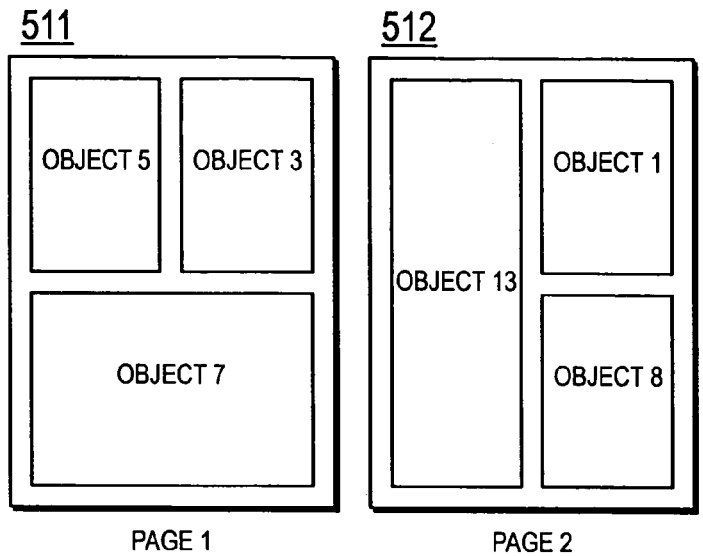
FIG. 18 is a diagram showing the output result of printer 20B when printer 20B does not cause any memory overflow while receiving PDF file 42 from PC 10B.
FIG. 19 is a diagram showing the registration status of an object information table when printer 20B causes a memory overflow while receiving PDF file 42 from PC 10B.
FIG. 20 is a diagram showing the registration status of an object information table when printer 20B causes a memory overflow while receiving PDF file 42 from PC 10B.

FIG. 18 is a diagram showing the output result of printer 20B when printer 20B did not cause any memory overflow (S501-S503: No and S504-S506 in the flowchart of FIG. 6) while printer 20B was receiving PDF file 42 from PC 10B. In this case, printer 20B receives all of the constituent data of the PDF file from PC 10B similar to the case of normal PDF direct printing (S501-S503: No and S504), analyzes the received PDF file 42 (S505), and outputs it for printing (S506). Printed item 511 represents the output result of the first page, while printed item 512 represents the output result of the second page of PDF file 42. In other words, PDF file 42 consists of two pages in total and contains six content objects, i.e., objects 1, 3, 5, 7, 8 and 13, while the first page contains objects 3, 5 and 7 and the second page contains objects 1, 8 and 13 in the positional relations as shown in FIG. 18.

Figure 23:
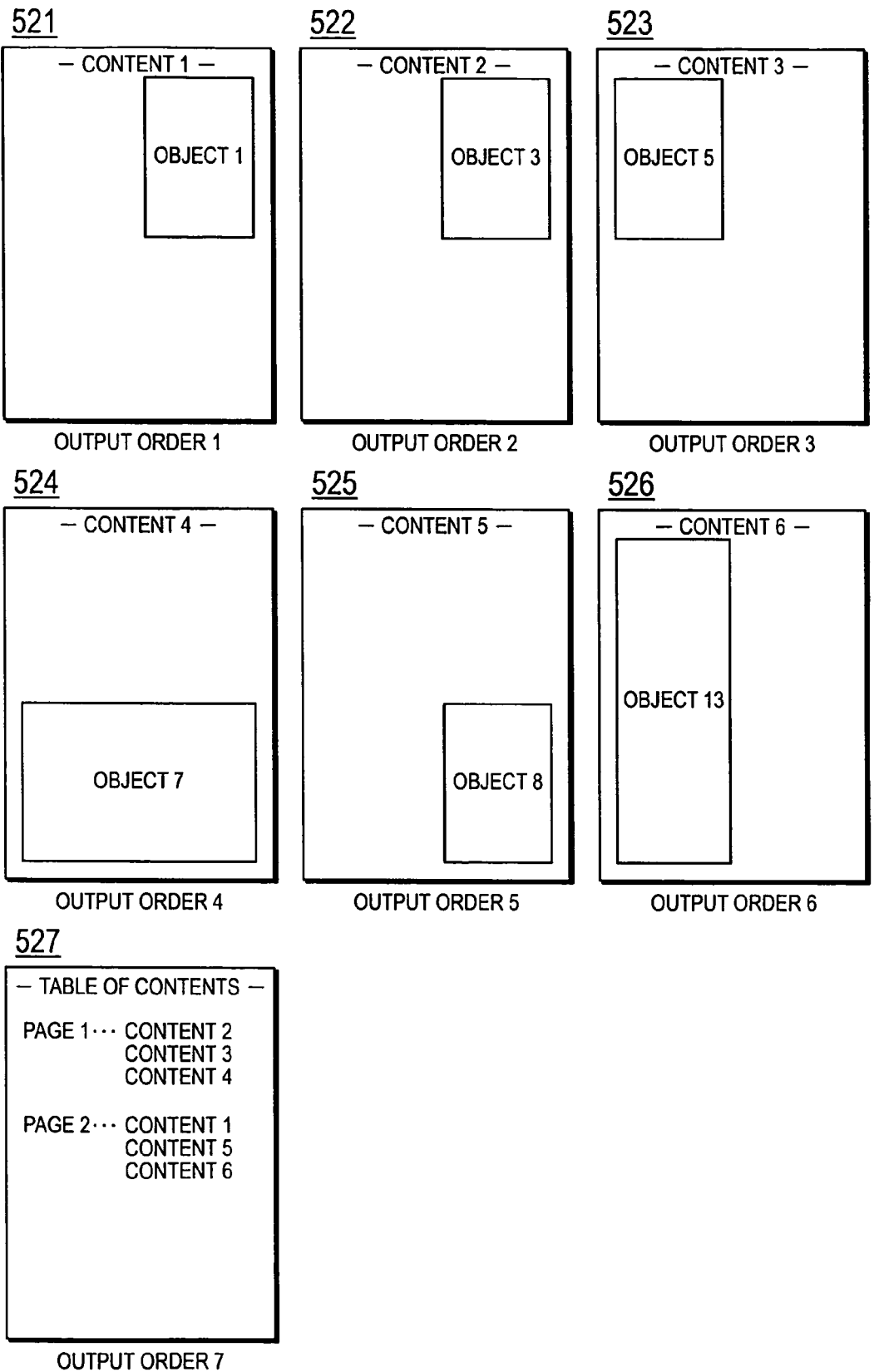
FIG. 23 is a diagram showing the output result of printer 20B when printer 20B causes a memory overflow while receiving PDF file 42 from PC 10B.

FIG. 19 through FIG. 22 are step-by-step diagrams showing the registration process of the object information table when a memory overflow occurs while printer 20B is receiving PDF file 42 from PC 10B (S501-S503: Yes and S507-S525 in the flowchart of FIG. 14 through FIG. 16), and FIG. 23 shows the output results of printer 20B in such a case.

It is assumed here that printer 20B caused a memory overflow while receiving the data of the header and objects 1 through 7 of the constituent data of PDF file 42 from PC 10B (S504: Yes). After initiating the object information table (S507), printer 20B retrieves the header, i.e., the head data of the abovementioned data stored in RAM 203 (S508). Next, since the header is neither the content object, page object, nor the page list object (S509: No; S516: No; and S519: No), printer 20B deletes the header data from RAM 203 (S522). Since the header is not the end data of PDF file 42 (S523: No) and not all of the constituent data of PDF file 42 have been received (S514: No), printer 20B receives the successive constituent data of PDF file 42 to fill up the space available in RAM 203 (S515), and retrieves the data of object 1 which has become the next head in RAM 203 (S508).

Next, since object 1 is a content object (S509: Yes), printer 20B assigns an identification name to object 1, and registers the information of object 1 to the object information table (S510). FIG. 19 shows the registration status of the object information table at this point. The object information table contains such object information as object type, object number, object ID name, page number, page object number, content object number, etc. The page number, incase of a content object, here means the page number of a PDF file in which said content object is included, or in case of a page object, means the page number of a PDF file displayed by said page object. The page object number, in case of a content object, is the number of a page object in which said content object is included, or in case of a page list object, is the number of the page object (the order of the numbers is the order of the pages) that displays each page of the PDF file. The content object number in case of a page object is the number of the content object contained in said page object. It is registered into an object information table 611 as the information of object 1 that the object type is "content object," the object number is "1," and the object identification name is "content 1." At this point in time, the information related to the page number and the page object number concerning object 1 are not known so that they are registered as "unknown."

Next, printer 208 analyzes the data of object 1 (S511), and prints the contents of object 1 together with the identification name (S512). Printed item 521 shown in FIG. 23 shows the output result of printer 20B at this point. In addition to the character string of "Contents 1" which is the identification name of object 1, characters, graphics and images related to the contents of object 1 are shown on printed item 521. Since the content object includes, as mentioned before, the instructions for the coordinate system that specify the locations and sizes of characters, graphics and images within the page, the locations and sizes of characters, graphics and images within the page concerning the contents of object 1 are accurately reflected on printed item 521. Although the identification name of object 1 is outputted in the head of printed item 521 here, the output location of the identification name of the content object is not particularly specified in this embodiment, and can be outputted in the upper or lower part of the output area of the contents of the content object.

Printer 20B deletes the data of object 1 from RAM 203 (S513), receives the constituent data of PDF file 42 to match the vacant capacity of RAM 203 (S515) if not all of the constituent data of the PDF file have been received (S514: No), and reads the data of object 2 that has become the next head in RAM 203 (S508).

Next, a case will be described below wherein the data of object 4 has become the head in RAM 203 as the rest of the process being conducted as described above. Since object 4 is a page object (S509: No and S516: Yes), the information of object 4 is registered into the object information table (S517). FIG. 20 shows the registration status of the object information table at this point. It is registered into an object information table 612 as the information of object 4 that the object type is "page object," the object number is "4," and the content object numbers are "3, 5, 7," i.e., the page displayed by object 4 contains the contents of objects 3, 5, and 7, which are content objects. At this point in time, the information related to the page number displayed by object 4 is not known so that it is registered as "unknown." Further, based on the information that the content object numbers are "3, 5, 7," i.e., the information that object 4 contains object 3, which is a content object, the information about the page object number of object 3, which has hither to been unknown, is updated to "4" concerning the previously registered object 3. It then deletes the data of object 4 from RAM 203 (S518), and reads the data which has become the head in RAM 203 (S508).

Next, a case where the data of object 9 has become the head in RAM 203 will be described. Since object 9 is a page list object (S509: No; S516: No; and S519: Yes), the information of object 9 is registered into the object information table (S520). FIG. 21 shows the registration status of the object information table at this point. It is registered into an object information table 613 as the information of object 9 that the object type is "page list object," the object number is "9," and the page object numbers are "4, 11," i.e., PDF file 42 consists of two pages in total, wherein the first page is displayed by object 4, which is a page object, and the second page is displayed by object 11, which is also a page object. Further, based on the information that the page object numbers are "4, 11," i.e., the information that object 4, which is a page object, displays the first page of PDF file 42, the information about the page number, which has hitherto been unknown, is updated to "1" concerning the previously registered object 3, 4, 5 and 7. It then deletes the data of object 9 from RAM 203 (S521), and reads the data which has become the head in RAM 203 (S508)

Thus, the header, objects 1 through 13 of the body and the correlation reference table of PDF file 42 are processed one by one and, as a consequence, the header, object 2, which is a catalog object, object 6, which is a resource object, object 10, which is a font object, object 12, which is a font information object, and the data of correlation reference table are deleted from RAM 203. Objects 1, 3, 5, 7, 8 and 13, which are content objects, are assigned with identification names "content 1," "content 2," "content 3," "content 4," "content 5" and "content 6" respectively to be registered on the object information table, and the contents of the objects are printed with the identification names. FIG. 22 shows the final registration status of the object information table. Printed items 521 through 526 of FIG. 23 show the results of outputting objects 1, 3, 5, 7, 8 and 13 by printer 20B.

Finally, the trailer, which is the last data in RAM 203, is read (S508), and deleted from RAM (S509: No; S516: No; S519: No; and S522). Since the trailer is the end data of PDF file 42 (S523: Yes), printer 20B prepares a table of contents referring to an object information table 614 (FIG. 22) (S524), and prints the prepared table of contents (S525). A printed item 527 of FIG. 23 shows the output result of the table of contents by printer 20B. It is described on printed item 527 as the table of contents of PDF file 42 that the first page contains the contents of printed items printed under identification names of "content 2," "content 3," and "content 4," i.e., printed items 522, 523 and 524; and the second page contains the contents of printed items printed under identification names of "content 1," "content 5," and "content 6," i.e., printed items 521, 525 and 526. Thus, the user can find the contents of the document of PDF file 42 exactly by combining printed items 521 through 526 based on the information of the table of contents of printed item 527 outputted by printer 20B even if a memory overflow occurs while printer 20B is receiving PDF file 42. Moreover, if necessary, it is possible to restore the printed item of PDF file 42 in an almost complete form by cutting and pasting or scanning and overlaying the outputted parts of the objects of printed items 521 through 526.

Next, the third embodiment of the invention will be described below. A printer 20C according to this embodiment is constituted similarly as printer 20B of the second embodiment (refer to FIG. 3), and is interconnected via network 30 with PC 10B to be communicable with each other (refer to FIG. 1). FIGS. 24 through 27 constitute a flowchart showing the sequence of image forming process by means of printer 20C. The algorithm shown in the flowcharts of FIG. 24 through FIG. 27 is stored as a program in a memory unit such as a ROM 202 of printer 20C and executed by CPU 201.

Figure 24:
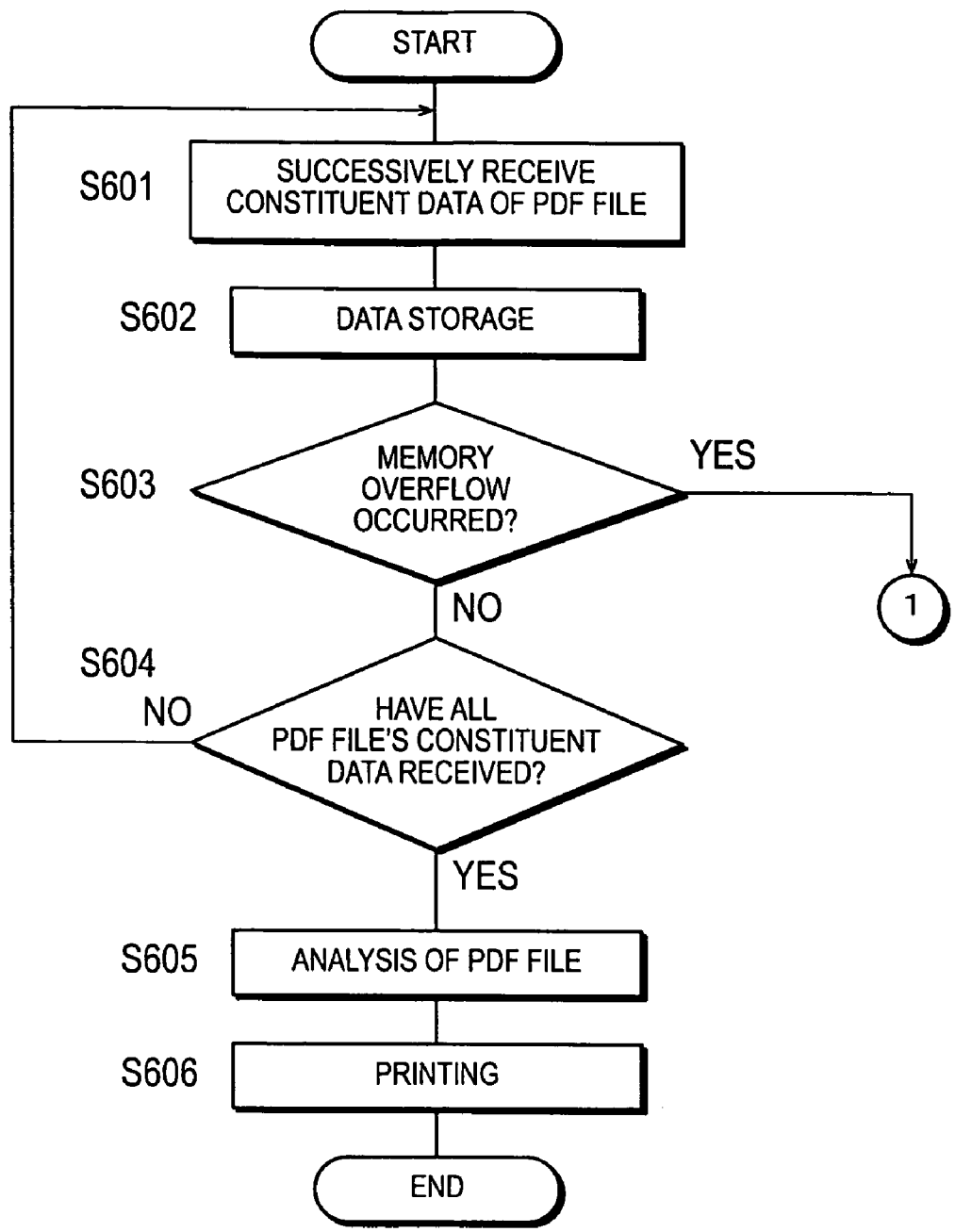
FIG. 24 is a flowchart showing the procedure of image forming process of a printer 20C concerning a second embodiment of the present invention.

In FIG. 24, since the operations of printer 20C receiving from PC 10B all the constituent data of the PDF file without causing a memory overflow (S601-S603: No and S604-S606) are identical to the operations of printer 20B in the aforementioned second embodiment (S501-S503: No and S504-S506), the description is omitted.

If a memory overflow occurs while receiving the constituent data of the PDF file (S603: Yes), printer 20C initializes the object information table (S607) and then reads the head of the constituent data of the PDF file stored in RAM 203 (S608). If the retrieved data relates to the content object (S609: Yes), printer 20C reffers to the object information table, assigns an identification name to said content object in case said content object has not been registered in the object information table (S610: No), and registers the information of said content object to the object information table (S611). Next, it analyzes said content object (S612), converts it to a printing image, and outputs it for printing with its identification name (S613). If, in step S610, said content object is registered on the object information table already (S610: Yes), said content object is analyzed immediately (S612), converted into a printing image, and is printed out with the identification name already registered in the object information table (S613). It deletes then the data of said content object from RAM 203 (S614), and if not all of the PDF file constituent data have been received (S615: No), receives the successive data to fill the capacity of RAM 203 vacated by deleting the data of said content object (S616), and reads the head of the constituent data of the PDF file stored in RAM 203 again (S608). If all of the constituent data of the PDF file are received in step S615 (615: Yes), the head of the remaining data stored in RAM 203 is retrieved (S608).

If the data retrieved in step S608 relates to the page object (S609: No and S617: Yes), printer 20C reffers to the object information table, assigns an identification name to said page object in case said page object has not been registered in the object information table (S618: No), and registers the information of said page object to the object information table (S619). Moreover, if a portion or all of the content objects contained in said page object are not registered in the object information table (S620: No), printer 20C assigns identification names to the unregistered content objects and registers them with their object numbers on the object information table (S621).

Next, the identification names of all the content objects contained in the specific page object are printed out together with the identification name of the specific page object (S622). If, in S618, a specific page object is already registered on the object information table in step (S618: Yes), or in S620, a portion or all of the content objects contained in the specific page object are already registered on the object information table (S620: No), the identification name of the specific page object or the identification names of the content objects are to be printed out in step S622 using the names already registered on object information table. Printer 20C then deletes the data of the specific page object from RAM 203 (S623), and following the procedures of steps S615 and S616, it reads the head of the constituent data of the PDF file stored in RAM 203 again (S608).

Further, if the data retrieved in step S608 concerns with the page list object (S609: NO; S617: No; and S624: Yes), printer 20C registers the information of the specific page list object on the object information table (S625), and if a portion or all of the page objects are not registered on the object information table (S626: No), it assigns identification names to the unregistered page objects and registers those page objects on the object information table (S627). Next, the identification names of the page objects and corresponding page numbers are printed out based on the information of specific page list object (S628).

If, in step S626, a portion or all of the page objects are already registered on the object information table (S626: Yes), the identification name of the specific page object in step S628 is to be printed out using the name already registered on object information table. Printer 20C then deletes the data of the specific page list object from RAM 203 (S629), and following the procedures of steps S615 and S616, it reads the head of the constituent data of the PDF file stored in RAM 203 again (S608).

On the other hand, if the data retrieved in step S608 does not concern with either the content object, page object, or page list object (S609: No; S617: No; and S624: No), it deletes said data from RAM 203 (S630), while, if said data is not the end data of the PDF file (S631: No), it reads the head of the PDF constitution data stored in RAM 203 again through the procedures of steps S615 and S616 (S608). If the data deleted in step S630 is the end data of the PDF file (S631: Yes), the image forming process is terminated.

Next, the procedures of the image forming process by printer 20C according to this embodiment will be described in more details referring to a concrete example. A case of receiving PDF file 42 and to output for printing similar to the case of printer 20B in the second embodiment will be described here (refer to FIG. 17). The output results when printer 20C does not cause any memory overflow while receiving PDF file 42 from PCB 10B (S601-S603: No and S604-S606 in the flowchart of FIG. 24) are the same as the ones shown in FIG. 18 (printed items 511 and 512).

Figure 31:
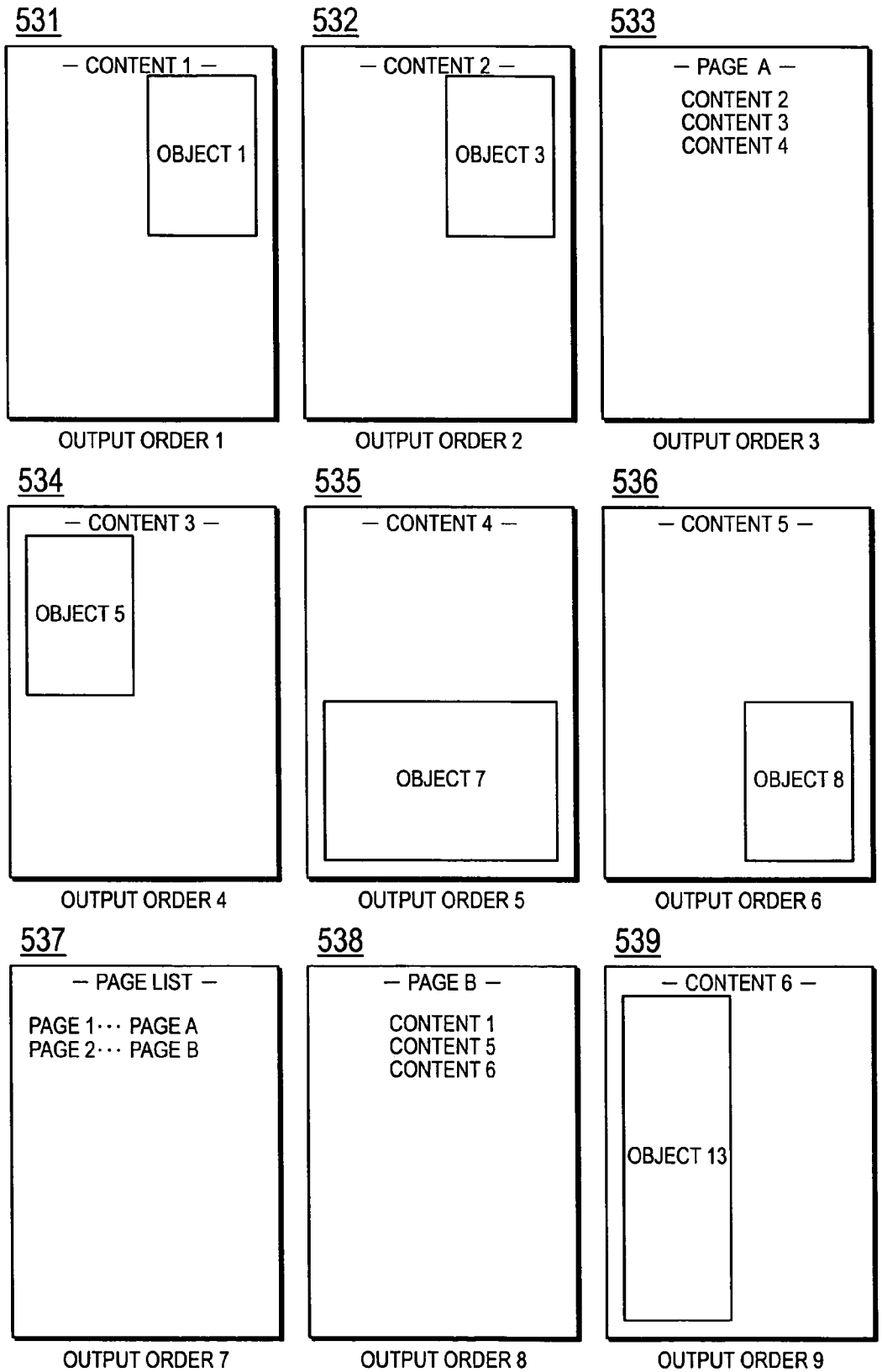
FIG. 31 is a diagram showing the output result of printer 20C when printer 20C causes a memory overflow while receiving PDF file 42 from PC 10B.

FIG. 28 through FIG. 30 are step-by-step diagrams showing the registration process of the object information table when a memory overflow occurs while printer 20C is receiving PDF file 42 from PC 10B (S601-S603: Yes and S607-S631 in the flowchart of FIG. 24 through FIG. 27), and FIG. 31 shows the output results of printer 20C in such a case.

It is assumed here that printer 20C caused a memory overflow while receiving the data of the header and objects 1 through 7 of the constituent data of PDF file 42 from PC 10B (S604: Yes). After initiating the object information table (S607), printer 20C retrieves the header, i.e., the head data of the abovementioned data stored in RAM 203 (S608). Next, since the header is neither the content object, page object nor page list object (S609: No; S617: No; and S624: No), printer 20C deletes the header data from RAM 203 (S630) Since the header is not the end data of PDF file 42 (S631: No) and not all of the constituent data of PDF file 42 have been received (S615: No), printer 20C receives the successive constituent data of PDF file 42 to fill up the space available in RAM 203 (S616), and retrieves the data of object 1 which has become the next head in RAM 203 (S608).

Next, since object 1 is a content object (S609: Yes), and object 1 has not been registered on the object information table (S610: No), printer 20C assigns an identification name to object 1, and registers the information of object 1 to the object information table (S611). The registration status of the object information table at this point is similar to the one shown in FIG. 19 (object information table 611).

Next, printer 20C analyzes the data of object 1 (S612), and prints the contents of object 1 together with the identification name (S613). Printed item 531 shown in FIG. 31 shows the output result of printer 20C at this point.

Printer 20C deletes the data of object 1 from RAM 203 (S614), receives the constituent data of PDF file 42 to match the vacant capacity of RAM 203 (S616) if not all of the constituent data of the PDF file have been received (S615: No), and reads the data of object 2 that has become the next head in RAM 203 (S608).

Next, a case will be described below wherein the data of object 4 has become the head in RAM 203 as the rest of the process being conducted as described above. Object 4 is a page object (S609: No and S617: Yes), and object 4 has not been registered on the object information table (S618: No), printer 20C assigns an identification name to object 4, and registers the information of object 4 to the object information table (S619). FIG. 28 shows the registration status of the object information table at this point. It is registered on object information table 621 as the information of object 4 that the object type is "page object," the object number is "4," and the object identification name is "content A" and the contents numbers are "3, 5, 7." At this point in time, the information related to the page number displayed by object 4 is not known so that it is registered as "unknown." Further, based on the information that the content object numbers are "3, 5, 7," i.e., the information that object 4 contains objects 3, 5 and 7, which are content objects, printer 20C assigns identification names "content 3" and "content 4" to the unregistered objects 5 and 7 respectively, registers the information as content objects to the object information table (S620: No and S621), and updates the information about the page object number of the already registered object 3, which has been unknown, to "4."

Next, the identification names of objects 3, 5 and 7 are printed out with the identification name of object 4 (S622). Printed item 533 shown in FIG. 31 shows the output result of printer 20C at this point. Printed item 533 is printed with string of characters "page A," which is the identification name of object 4 as well as "content 2," "content 3," and "content 4," which are the identification name of objects 3, 5 and 7 respectively. Thus, the user can learn that "page A," a specific page of PDF file 42, contains the contents of. "content 2," "content 3," and "content 4." Printer 20C then deletes the data of object 4 from RAM 203 (S623), and reads the data which has become the head in RAM 203 (S608).

Next, a case where the data of object 9 has become the head in RAM 203 will be described. Since object 9 is a page list object (S609: No; S617: No; and S624: Yes), the information of object 9 is registered on the object information table (S625). FIG. 29 shows the registration status of the object information table at this point. It is registered on an object information table 622 as the information of object 9 that the object type is "page list object," the object number is "9," and the object identification name is "page list" and "content 4, 11." Although an identification name "page list" is assigned to object 9, it is not necessary to assign an identification name to the page list object in this embodiment. Also, based on the information that the page object number is "4, 11," i.e., PDF file 42 consists of two pages, and that object 4, which is a page object, displays the first page, and object 11 displays the second page of PDF file, printer 20C assigns an identification name, "page B," to the unregistered object 11 and registers said information on the object information table as a page object (S626: No and S627), and updates the information about the page number for already registered objects 3, 4, 5 and 7., which has been unknown, to "1."

Next, the identification number of objects 4 and 11, which are the page objects, and the page number of PDF file 42 displayed by them are printed out (S628). Printed item 537 shown in FIG. 31 shows the output result of printer 20C at this point. Printed item 537 is printed with "page list," which is the identification name of object 9, together with character strings of "page A," which is the identification name of object 4, and its page number "page 1," and "page B," which is the identification name of object 11, and its page number "page 2," paired respectively. Thus, the user can learn that PDF file 42 consists of the first page is "page A" and the second page is "page B." Printer 20C then deletes the data of object 9 from RAM 203 (S629), and reads the data which has become the head in RAM 203 (S608).

Thus, the header, objects 1 through 13 of the body and the correlation reference table of PDF file 42 are processed one by one and, as a consequence, the header, object 2, which is a catalog object, object 6, which is a resource object, object 10, which is a font object, object 12, which is a font information object, and the data of correlation reference table are deleted from RAM 203. Objects 1, 3, 5, 7, 8 and 13, which are content objects, are assigned with identification names "content 1," "content 2," "content 3," "content 4," "content 5" and "content 6" respectively to be registered on the object information table, and the contents of the objects are printed with the identification names. FIG. 30 shows the final registration status of the object information table 623. Printed items 531, 532, 534 through 536, and 539 of FIG. 31 show the results of outputting objects 1, 3, 5, 7, 8 and 13 by printer 20C. Moreover, object 4 and object 11, which are page objects, are registered on the object information table, being assigned with identification names "page A" and "page B" respectively, and the identification names of said objects and the identification names of the content objects contained therein are printed. Printed items 533 and 538 of FIG. 31 show the output results of object 4 and 11 by printer 20C.

Finally, the trailer, which is the last data in RAM 203, is read (S508), and deleted from RAM (S609: No; S617: No; S624: No; and S630).

Thus, in FIG. 31, the user can find the contents of the document of PDF file 42 exactly by combining printed items 531, 532, 534 through 536 and 539 based on the information of printed item 533, 537 and 538 outputted by printer 20C even if a memory overflow occurs while printer 20C is receiving PDF file 42. Moreover, if necessary, it is possible to restore the printed item of PDF file 42 in an almost complete form by cutting and pasting or scanning and overlaying the outputted parts of the objects of printed items 531, 532, 534 through 536 and 539.

Figure 32:
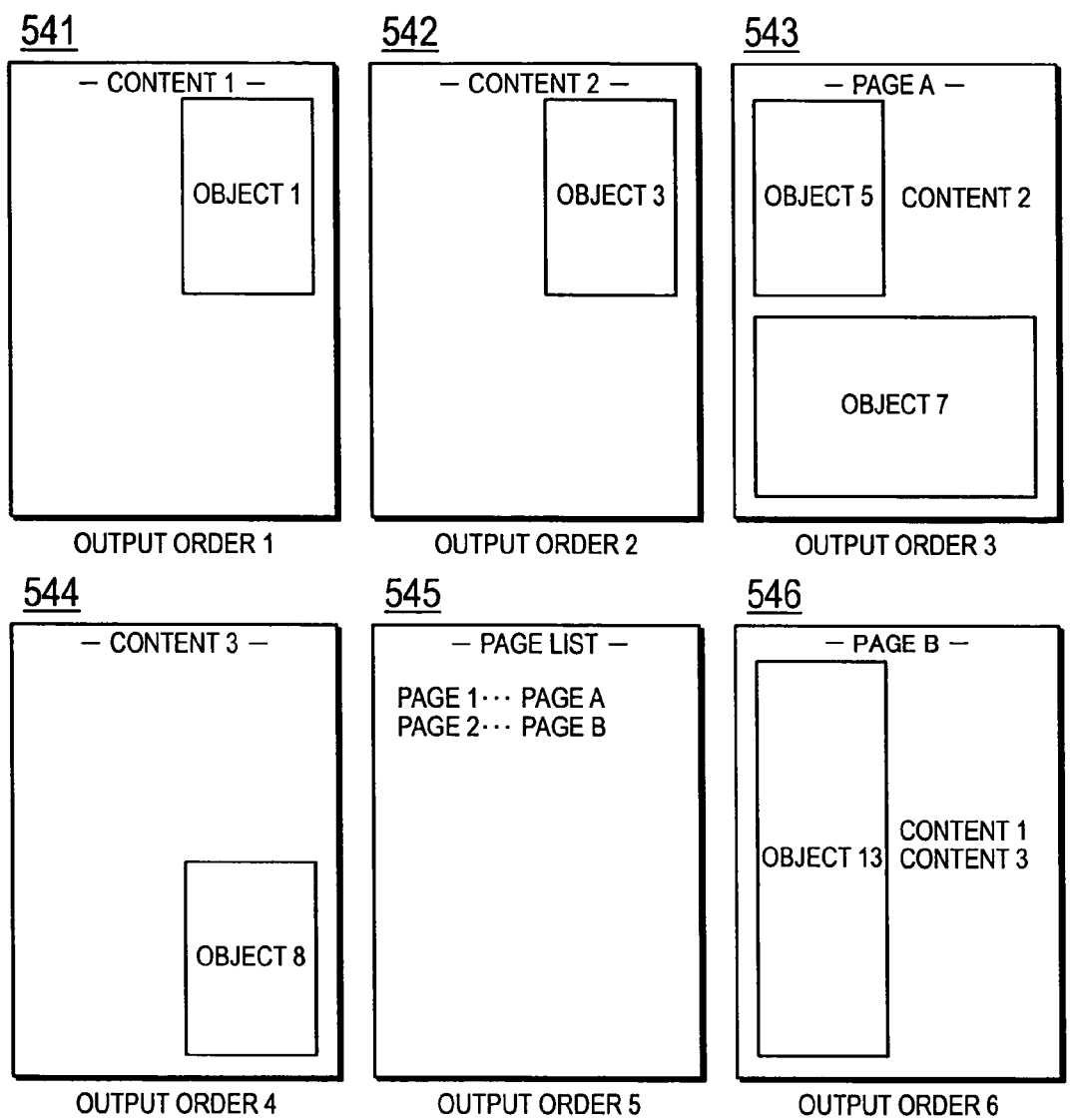
FIG. 32 is a diagram for illustrating the output result of memory overflow of a printer 20D according to a third embodiment of the present invention.
Figure 33:
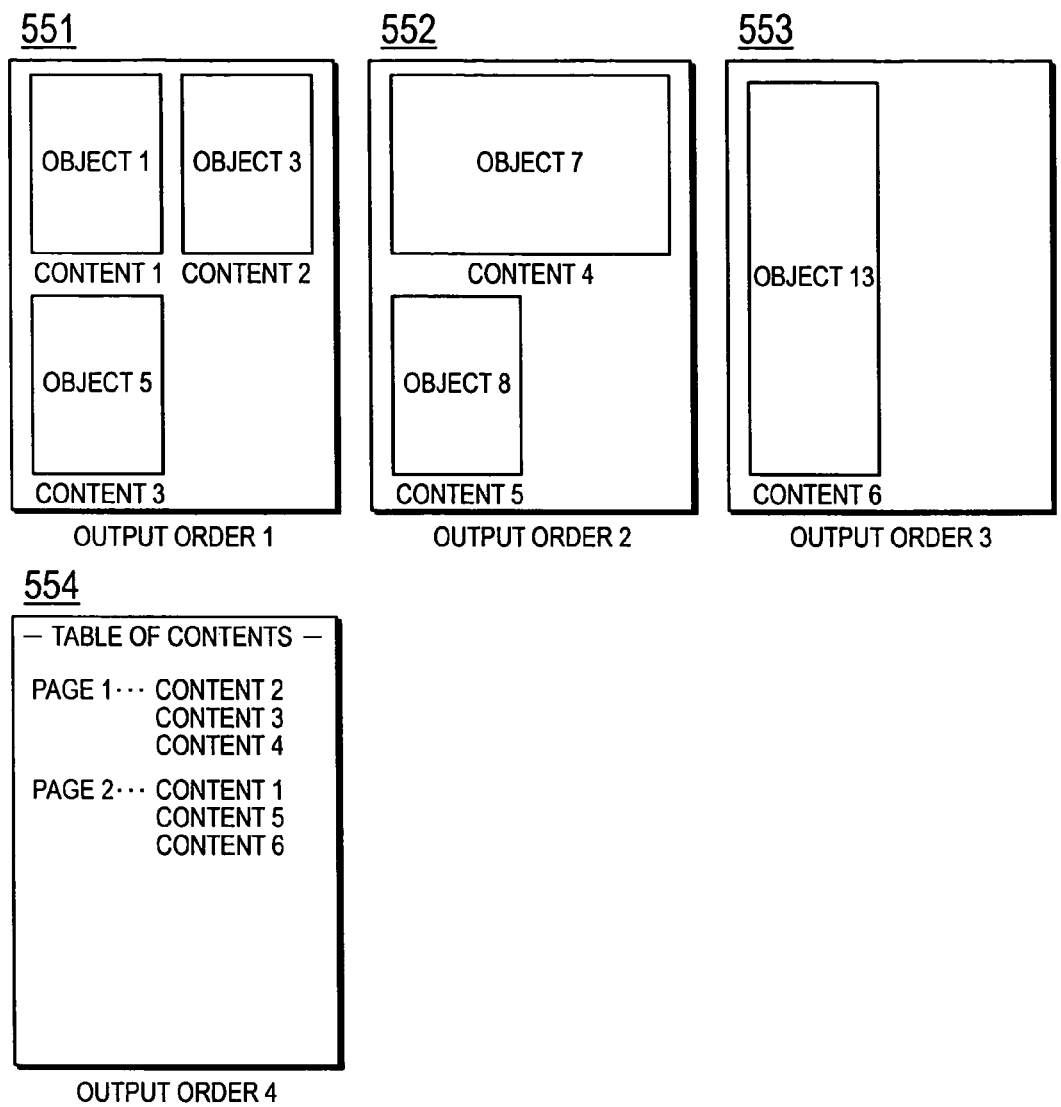
FIG. 33 is a diagram for illustrating the output result of memory overflow of a printer 20E according to a fourth embodiment of the present invention.

FIGS. 32 and 33 are diagrams for describing the output result of memory overflow of a printer 20D and 20E according to a fourth and fifth embodiments of the invention respectively. Printers 20D and 20E according to these embodiments are constituted similarly as printer 20B of the second embodiment (refer to FIG. 3), and are interconnected via network 30 with PC 10B to be communicable with each other (refer to FIG. 1). Also, FIGS. 32 and 33 show the output results of printers 20D and 20E when memory overflows occurred while receiving PDF file 42 similar to the cases of the second and third embodiments.

The fourth embodiment is a variation of the third embodiment. The operation of printer 20D according to the fourth embodiment differs from the operation of printer 20C according to the third embodiment in that, in the processing of a page object in the constituent data of the received PDF file, instead of printing out the identification name of the page object and the identification names of the content objects contained in the page object immediately after the registration of the page object on the object information table assigning the identification name, printer 20D prints, if there are any content objects contained in the page object that are not yet processed, the contents of said unprocessed content objects together with the identification name of the page object after processing all the unprocessed content objects.

In other words, in FIG. 24, printer 20D processes from the head of the constituent data of PDF file 42 stored in RAM 203 sequentially similar to printer 20C in the third embodiment, and prints out the contents of object 1 and object 3 together with strings of characters, "content 1" and "content 2," which are their respective identification names (printed items 541 and 542). Next, in processing object 4, which is a page object, among the content objects included in object 4, i.e., object 3, object 5 and object 7, object 5 and object 7 are both unprocessed at this time, so that the program advances to the process of the next head data in RAM 203 without printing the identification name. At the time when object 7, which is to be processed last among the unprocessed content objects, is finally processed, printer 20D prints the contents of object 5 and object 7 together with the character string, "page A," which is the identification name of object 4 (refer to printed item 543). As for object 3, which has been outputted already, the character string of "content 2," the identification name, is outputted on the paper margin. Similarly, as for object 11, which is a page object, printer 20D prints the contents of object 11 and the character strings "content 1" and "content 3," which are the identification names of object 1 and object 8 respectively at the time when object 13, the unprocessed one among object 1, object 8 and object 13, which are contained in object 11, is printed out finally together with the character string "page B" which is the identification name of object 11 (refer to printed item 546). This allows the user to print the information of a page object, not just to print, but to print in a layout close to the layout of the content objects on the actual page of PDF file 42, and also to minimize the volume of printed items compared to the case of the third embodiment.

The fifth embodiment is a variation of the second embodiment. The operation of a printer 20E according to the fifth embodiment differs from the operation of printer 20B according to the second embodiment in that, in the processing the content objects contained in the constituent data of the received PDF file, it does not print out the contents of the content objects immediately after registering the content objects with identification names on the object information table, but rather to print out after combining multiple content objects on the same paper, if there are any content objects that can be laid out on the same paper by combining them.

Figure 25:
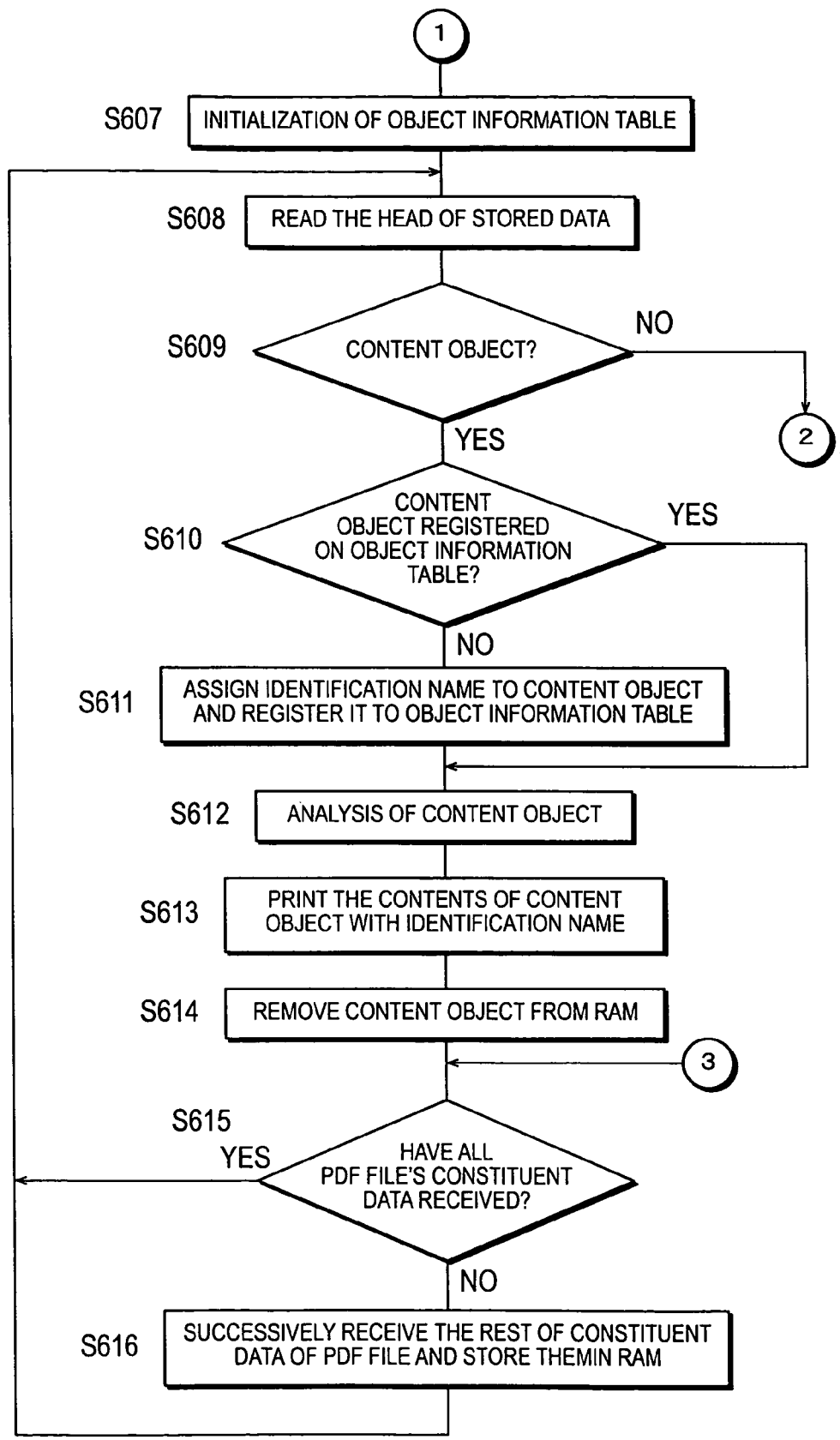
FIG. 25 is a flowchart showing the procedure of image forming process by means of printer 20C.
Figure 26:
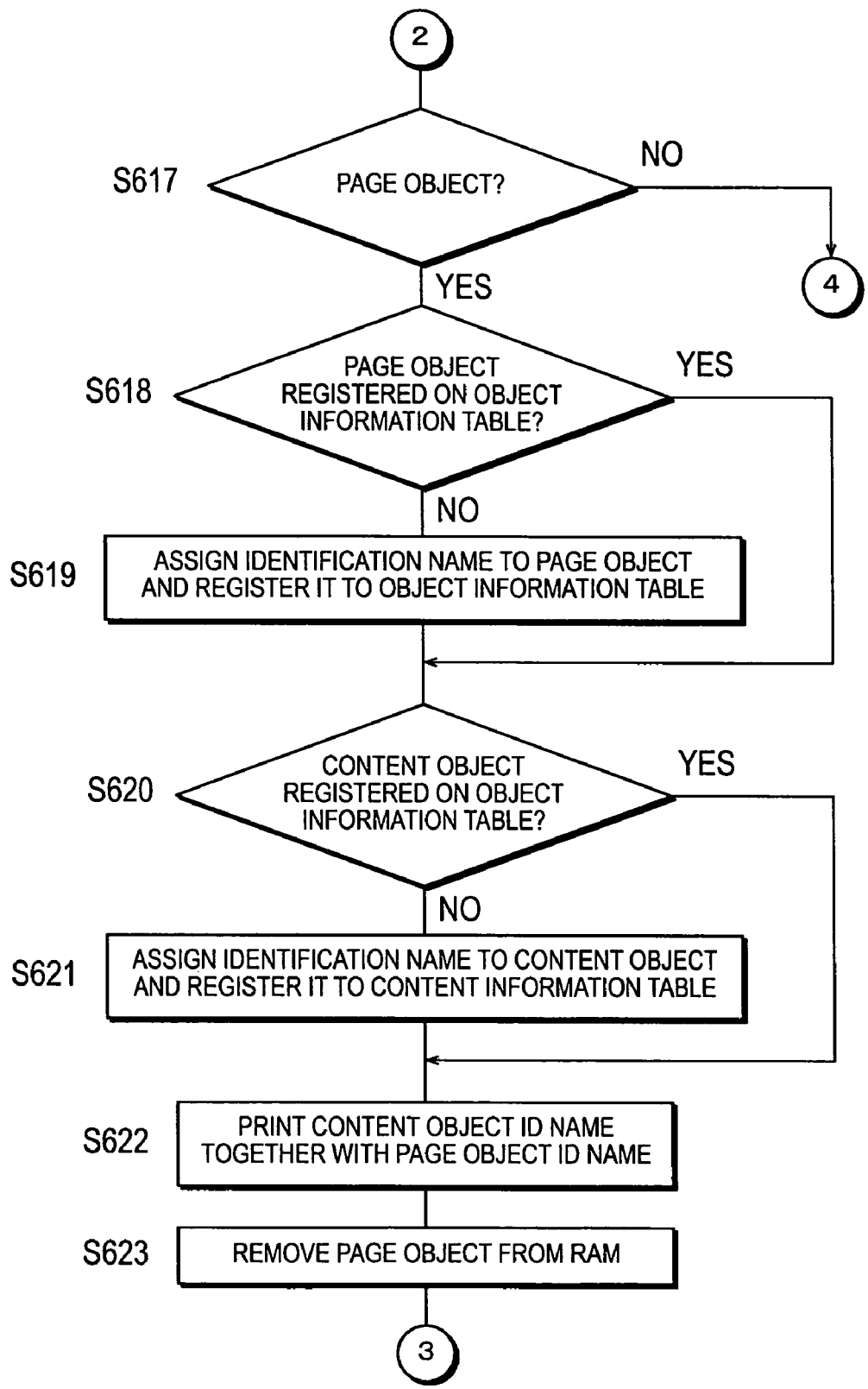
FIG. 26 is a flowchart showing the procedure of image forming process by means of printer 20C.
Figure 27:
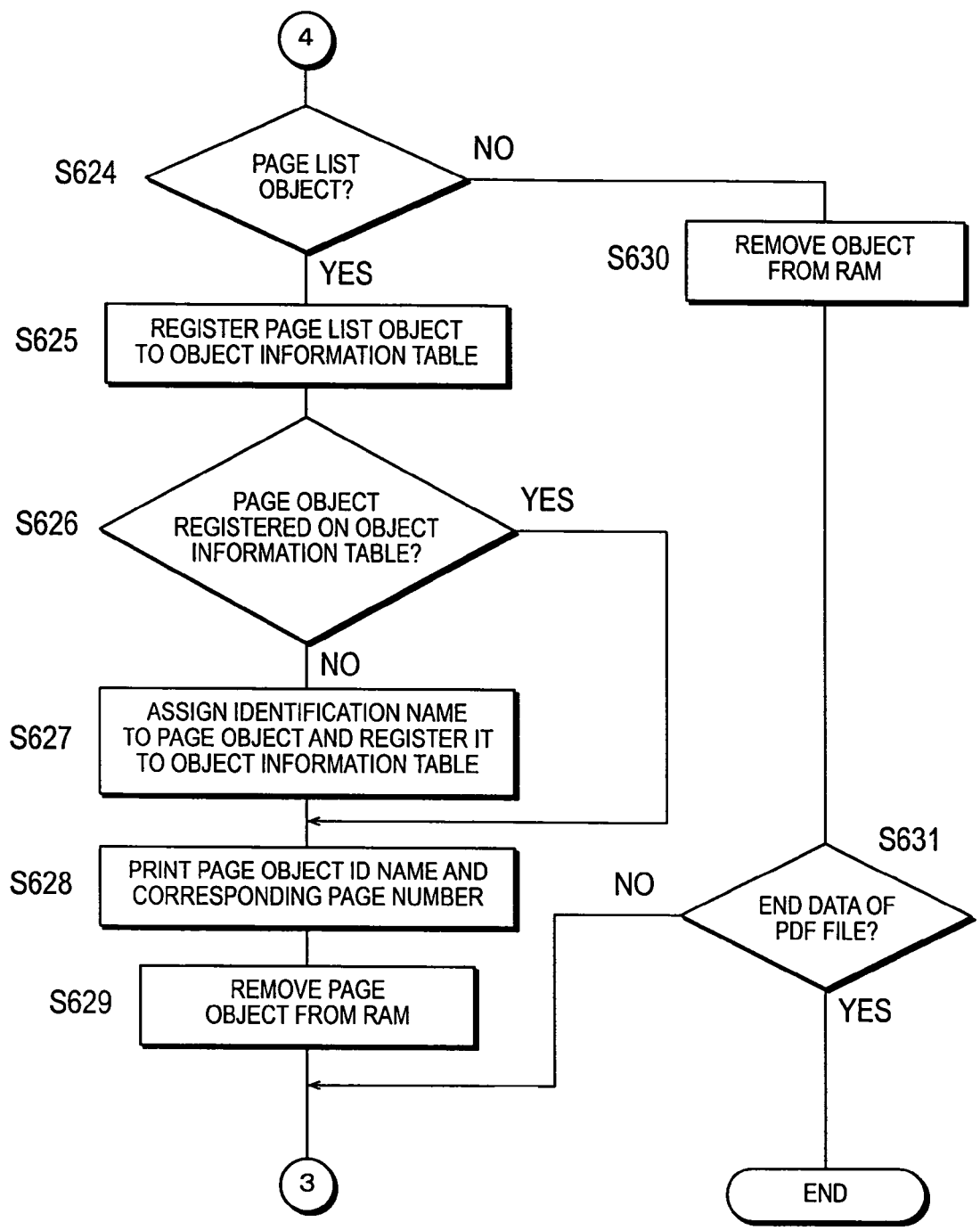
FIG. 27 is a flowchart showing the procedure of image forming process by means of printer 20C.

In other words, in FIG. 25, among the constituent data of PDF file 42 stored in RAM 203, printer 20E processes them starting with the head data as in the case of printer 20B in the second embodiment. In processing object 1, which is a content object, printer 20E registers the information of object 1 assigning an identification name to object 1, analyzes the data of object 1, extracts and stores the size information only to the object information table, and advances to the processing of the next head data stored in RAM 203 without outputting the contents of the content object. The size information of other content objects, i.e., object 3, object 5 and object 7, are obtained similarly. In case a memory overflow occurs, the size information of the content objects are compared at the time when all the constituent data (data of the header and objects 1 through 7) of PDF file 42 stored in RAM 203 are processed, and object 1, object 3 and object are printed out in combination on the same paper together with the character strings, "content 1," "content 2," and "content 3," which are their identification names (refer to printed item 551). In order to combine object 1, object 3 and object 5 more space-efficiently, their positional information is disregarded and they are laid out, for example, from the top left corner in sequence. Next, the data for object 1, object 3 and object 5 are deleted from RAM 203, and the constituent data of the PDF file is successively received so long as it can fit into the vacant space available in RAM 203. Printed items 552 and 553 are outputted by processing them similarly and the table of contents for PDF file 42 is prepared and outputted similar to the case of printer 20B in the first embodiment to complete the entire process. Thus, it is possible to output the content objects combined more space-efficiently, hence minimizing the volume of printed items compared to the second embodiment.

Although it was assumed that, in outputting the contents of a content object contained in the constituent data of the received PDF file, the identification name assigned to said content object are to be outputted simultaneously, and also the information of the identification names of content objects contained in each page are to be outputted, it is also possible to be constituted in such a way that the identification name and the information are not outputted when outputting the contents of a content object. Even with such a constitution, the user can still know the outline of the contents of the PDF file based on the printed items concerning the content objects thus obtained; moreover, depending on the purpose of printing the PDF file, the user may not need an accurate replica of the document and may want to obtain only the image data of the PDF file.

Although it was assumed in all of the above embodiments that the content objects contained in the constituent data of the received PDF file are formed into images by each object automatically when a memory overflow occurs while the printer is receiving the PDF file, the present invention is not limited to such a format; for example, it can be constituted in such a way as to allow the occurrence of a memory overflow to be displayed on operating panel 104 of the printer or the display of PC 10B so that the user can select either to interrupt the printing of the PDF file or to form images by each content object according to the method of the invention. It can also be constituted in such a way as to allow the user to select arbitrarily by accepting the setup input in advance either to perform conventional PDF direct printing or to form images by each content object according to the method of the invention, regardless of whether a memory overflow occurs while the printer is receiving a PDF file.

The invention is not limited to the embodiment described above, but also can be changed in various ways within the scope of the claims.

For example, as a device to serve as an image processing device, computers such as a workstation and a server can be used instead of a PC. It is also possible to use, in place of a printer, an image forming device such as a facsimile machine, a copying machine, or an MFP (multi-function peripheral) that has a combination of their functions.

Although it was described in the above embodiments that a PDF file is transmitted from the PC to the printer based on the user's operation on the PC, the present invention is not limited to it. The present invention can be applied to a case where the PDF file to be printed is retrieved from a storage device where it is stored and printed by the printer by specifying the PDF file's storage place from the printer.

Moreover, although direct printing of PDF files was assumed in the above embodiments as the object of image forming process in this invention, the invention is not limited to it, and can be applied to any document files so long as contains objects for displaying a part or all of the contents of each page of the document and being capable of lining up in the file regardless of the order of said contents displayed in said document.

The image processing device and the image forming device according to this invention can be realized by a dedicated hardware circuit for executing the above-mentioned steps, or by causing a CPU to executed a program where said steps are described. If the present invention is to be materialized by the latter means, said programs for operating the image forming device and the like can be provided by computer readable recording medium such as a floppy® disk and CD-ROM, or can be provided on-line via a network such as the Internet. In this case, the program recorded on the computer readable recording medium is normally transferred to and stored in a memory device such as ROM and a hard disk. The program can also be provided as independent application software or can be built into the software of the image forming device as a part of its function.

As can be seen from the above description, in case of receiving directly and forming images of a document file containing objects for displaying a part or all of the contents of each page of the document and being capable of lining up in the file regardless of the order of said contents displayed in said document, such as a PDF file, the image forming device according to the present invention is capable of printing said page when said page becomes ready for printing as a result of all of the objects that constitute said page are stored in the memory, without having to wait the entire document file to be stored.

Also, it is also possible for the user to know the outline of the contents of the document from the printouts of the above-mentioned objects without having to wait for the reception of the entire document file, as said objects contained in the constituent data of said document file can be image-formed and printed out either singularly or in combination of multiple objects without limited to the order they are displayed in said document.

Furthermore, the user cannot only learn the contents of the document accurately from the object printouts mentioned above but also can reconstruct the document printouts in an almost complete form by cutting and pasting the object printouts with considering their location, etc., by means of outputting said objects attached with their identification names prior to the image formation of said objects and also outputting the information about the identification names of said objects contained in each page.

Therefore, the present invention makes it possible to form images by receiving said document file directly even when it is applied to an image forming device with a limited usable memory capacity.

What is claimed is:

1. An image forming device for receiving a document file that has not been converted into a printer-recognizable Page Description Language (PDL) format for direct printing and forming printable images of said document file, wherein said document file contains a plurality of pages and a plurality of unconverted objects for displaying a part or all of the contents of each page of the document and being capable of lining up in the file regardless of the order of said contents displayed in said document, comprising:

a receiving unit for successively receiving unconverted constituent data of said document file from an external device;

a storing unit for successively storing said objects contained in said unconverted constituent data received by said receiving unit;

a judging unit for judging whether all objects necessary for displaying a specific page out of the plurality of objects included in the document file are stored in said storing unit; and an image forming unit for forming images of said specific page before all of the unconverted constituent data of the document file have been received from the external device when:

the unconverted objects are not arranged according to page number of the document file, it is judged by said judging unit that all objects necessary for displaying said specific page are stored in said storing unit, and all of the plurality of objects included in the document file have not yet been stored in said storing unit.

2. An image forming device as claimed in claim 1, wherein said specific page is a head page among pages whose images have not been formed.

3. An image forming device as claimed in claim 1, further comprising: a deleting unit for deleting a specific object which has already been stored in said storing unit.

4. An image forming device as claimed in claim 3, further comprising:

a second judging unit for judging whether the amount of usage of said storing unit has exceeded a prescribed limit of usage; wherein said deleting unit is to delete said specific object from said storing unit when it is judged by said second judging unit that the amount of usage of said storing unit has exceeded the prescribed limit of usage.

5. An image forming device as claimed in claim 3, wherein said specific object is an object which is not necessary for displaying other pages whose images have not been formed among objects used for displaying pages whose images have been formed.

6. An image forming device as claimed in claim 3, further comprising:

a transmitting unit for transmitting a transmission request concerning the deleted object when an object for displaying said specific page is deleted from said storing unit by said deleting unit.

7. An image forming device as claimed in claim 1 wherein said document file is a PDF file.

8. An image forming device as claimed in claim 1, wherein the judging unit further judges whether or not the document file will be output in a normal order, successively from the first page toward the last page of the document file, or out of order, and the image forming unit forms images of said specific page after an additional judgment by the judging unit of whether the document file will be output in a normal order or out of order.

9. An image forming device as claimed in claim 8, wherein if the normal order is specified, the judging unit judges whether a head page of the document file is ready for output, and if the normal order is not specified, the images of the specific page are formed by the image forming unit regardless of whether the head page of the document file is ready for output.

10. A nontransitory computer readable medium storing a computer image forming program for receiving a document file that has not been converted into a printer-recognizable Page Description Language (PDL) format for direct printing and forming printable images of said document file, wherein said document file contains a plurality of pages and a plurality of unconverted objects for displaying a part or all of the contents of each page of the document and being capable of lining up in the file regardless of the order of said contents displayed in said document, said image forming program causing an image forming device to execute:

a receiving step for successively receiving unconverted constituent data of said document file from an external device;

a storing step for successively storing into a storing unit said objects contained in said unconverted constituent data received by said receiving step;

a judging step for judging whether all objects necessary for displaying a specific page out of the plurality of objects included in the document file are stored in said storing unit; and an image forming step for forming images of said specific page before all of the unconverted constituent data of the document file have been received from the external device in the receiving step when:

the unconverted objects are not arranged according to page number of the document file, it is judged by said judging step that all objects necessary for displaying said specific page are stored in said storing unit, and all of the plurality of objects included in the document file have not yet been stored in said storing unit.

11. An image forming program as claimed in claim 10, wherein said specific page is a head page among pages whose images have not been formed.

12. An image forming program as claimed in claim 10, further causing the image forming device to execute a deleting step for deleting a specific object which has already been stored in said storing unit.

13. An image forming program as claimed in claim 12, further causing the image forming device to execute:

a second judging-step for judging whether the amount of usage of said storing unit has exceeded a prescribed limit of usage; wherein said deleting step is to delete said specific object from said storing unit when it is judged by said second judging step that the amount of usage of said storing unit has exceeded the prescribed limit of usage.

14. An image forming program as claimed in claim 12, wherein said specific object is an object which is not necessary for displaying other pages whose images have not been formed among objects used for displaying pages whose images have been formed.

15. An image forming program as claimed in claim 12, further causing the image forming device to execute:

a transmitting step for transmitting a transmission request concerning the deleted object when an object for displaying said specific page is deleted from said storing unit by said deleting step.

16. An image forming program as claimed in claim 10 wherein said document file is a PDF file.

17. An image forming method for receiving a document file that has not been converted into a printer-recognizable Page Description Language (PDL) format for direct printing and forming printable images of said document file, wherein said document file contains a plurality of pages and a plurality of unconverted objects for displaying a part or all of the contents of each page of the document and being capable of lining up in the file regardless of the order of said contents displayed in said document, comprising:

a receiving step for successively receiving unconverted constituent data of said document file from an external device;

a storing step for successively storing into a storing unit said objects contained in said unconverted constituent data received by said receiving step;

a judging step for judging whether all objects necessary for displaying a specific page out of the plurality of objects included in the document file are stored in said storing unit; and an image forming step for forming images of said specific page before all of the unconverted constituent data of the document file have been received from the external device in the receiving step when:

the unconverted objects are not arranged according to page number of the document file, it is judged by said judging step that all objects necessary for displaying said specific page are stored in said storing unit, and all of the plurality of objects included in the document file have not yet been stored in said storing unit.

18. An image forming method as claimed in claim 17 wherein said document file is a PDF file.

19. An image forming device for receiving a document file that has not been converted into a printer-recognizable Page Description Language (PDL) format for direct printing and forming printable images of said document file, wherein said document file contains unconverted objects for displaying a part or all of the contents of each page of the document and being capable of lining up in the file regardless of the order of said contents displayed in said document, comprising:

a receiving unit for successively receiving constituent data of said document file from an external device before the constituent data is converted into the PDL format;

a storing unit for successively storing said objects contained in said constituent data before the constituent data is converted into the PDL format;

a judging unit for judging whether an amount of usage of said storing unit has exceeded a prescribed limit of usage;

an image forming unit for forming images of said objects stored in said storing unit either singly or in combination of two or more of them before all of the unconverted constituent data of the document file have been received from the external device and regardless of the order displayed in said document when it is judged by said judging unit that the amount of usage of said storing unit has exceeded the prescribed limit of usage;

a deleting unit for deleting said object whose image has been formed by said image forming unit from said storing unit after making a determination that said object is not necessary for output processing of another page whose output processing has not yet been completed; and an identification name assigning unit for assigning identification names to said objects stored in said storing unit in response to the judging unit judging that an amount of usage of said storing unit has exceeded the prescribed limit of usage;

wherein said image forming unit forms images of said objects together with the identification names assigned to said objects by said identification name assigning unit in response to the judging unit judging that an amount of usage of said storing unit has exceeded the prescribed limit of usage.

20. An image forming device as claimed in claim 19, further comprising:

an identification name information generating unit for generating identification name information which is information on the identification names of said objects contained in each page of said document; wherein said image forming unit further forms images of the identification name information generated by said identification name information generating unit.

21. An image forming device as claimed in claim 20, wherein said identification name information contains table of contents which displays each page number of said document and the identification names of said objects contained in the page related to said page number.

22. An image forming device as claimed in claim 20, wherein said identification name information contains page information which displays the identification names of said objects contained in a specific page of said document and the identification name of said specific page, and list of pages which displays each page number of said document and the identification name of a page related to said page number.

23. An image forming device as claimed in claim 19, wherein said image forming unit forms images of said object in the order stored in said storing unit.

24. An image forming device as claimed in claim 19, wherein said document file is a PDF file.

25. A nontransitory computer readable medium storing a computer image forming program for receiving a document file that has not been converted into a printer-recognizable Page Description Language (PDL) format for direct printing and forming printable images of said document file, wherein said document file contains unconverted objects for displaying a part or all of the contents of each page of the document and being capable of lining up in the file regardless of the order of said contents displayed in said document, said image forming program causing an image forming device to execute:

a receiving step for successively receiving constituent data of said document file from an external device before the constituent data is converted into the PDL format;

a storing step for successively storing into a storing unit said objects contained in said constituent data before the constituent data is converted into the PDL format;

a judging step for judging whether an amount of usage of said storing unit has exceeded a prescribed limit of usage;

an image forming step for forming images of said objects stored in said storing unit either singly or in combination of two or more of them before all of the unconverted constituent data of the document file have been received from the external device in the receiving step and regardless of the order displayed in said document when it is judged by said judging step that the amount of usage of said storing unit has exceeded the prescribed limit of usage;

a deleting step for deleting said object whose image has been formed by said image forming step from said storing unit after making a determination that said object is not necessary for output processing of another page whose output processing has not yet been completed; and an identification name assigning step for assigning identification names to said objects stored in said storing unit in response to the judging step judging that an amount of usage of said storing unit has exceeded the prescribed limit of usage;

wherein said image forming unit forms images of said objects together with the identification names assigned to said objects by said identification name assigning unit in response to the judging step judging that an amount of usage of said storing unit has exceeded the prescribed limit of usage.

26. An image forming program as claimed in claim 25, further causing the image forming device to execute:

an identification name information generating step for generating identification name information which is information on the identification names of said objects contained in each page of said document; wherein said image forming step further forms images of the identification name information generated by said identification-name information generating step.

27. An image forming program as claimed in claim 26, wherein said identification name information contains table of contents which displays each page number of said document and the identification names of said objects contained in the page related to said page number.

28. An image forming program as claimed in claim 26, wherein said identification name information contains page information which displays the identification names of said objects contained in a specific page of said document and the identification name of said specific page, and list of pages which displays each page number of said document and the identification name of a page related to said page number.

29. An image forming program as claimed in claim 25, wherein said image forming step forms images of said object in the order stored in said storing unit.

30. An image forming program as claimed in claim 25, wherein said document file is a PDF file.

31. An image forming method for receiving a document file that has not been converted into a printer-recognizable Page Description Language (PDL) format for direct printing and forming printable images of said document file, wherein said document file contains unconverted objects for displaying a part or all of the contents of each page of the document and being capable of lining up in the file regardless of the order of said contents displayed in said document, comprising:

a receiving step for successively receiving constituent data of said document file from an external device before the constituent data is converted into the PDL format;

a storing step for successively storing into a storing unit said objects contained in said constituent data before the constituent data is converted into the PDL format;

a judging step for judging whether an amount of usage of said storing unit has exceeded a prescribed limit of usage;

an image forming step for forming images of said objects stored in said storing unit either singly or in combination of two or more of them before all of the unconverted constituent data of the document file have been received from the external device in the receiving step and regardless of the order displayed in said document when it is judged by said judging step that the amount of usage of said storing unit has exceeded the prescribed limit of usage;

a deleting step for deleting said object whose image has been formed by said image forming step from said storing unit after making a determination that said object is not necessary for output processing of another page whose output processing has not yet been completed; and an identification name assigning step for assigning identification names to said objects stored in said storing unit in response to the judging step judging that an amount of usage of said storing unit has exceeded the prescribed limit of usage;

wherein said image forming unit forms images of said objects together with the identification names assigned to said objects by said identification name assigning unit in response to the judging step judging that an amount of usage of said storing unit has exceeded the prescribed limit of usage.

32. An image forming method as claimed in claim 31, wherein said document file is a PDF file.

\* \* \* \* \*

UNITED STATES PATENT AND TRADEMARK OFFICE
CERTIFICATE OF CORRECTION

| | | |
|---|---|---|
| PATENT NO. | : 8,310,713 B2 | Page 1 of 1 |
| APPLICATION NO. | : 10/730935 | |
| DATED | : November 13, 2012 | |
| INVENTOR(S) | : Sugimoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1385 days.

Signed and Sealed this
Eighteenth Day of November, 2014

Michelle K. Lee
*Deputy Director of the United States Patent and Trademark Office*